US012570064B2

(12) United States Patent
Hanan et al.

(10) Patent No.: US 12,570,064 B2
(45) Date of Patent: Mar. 10, 2026

(54) POLYESTER RESIN CLOSURES FOR CONTAINERS

(71) Applicant: Origin Materials Operating, Inc., West Sacramento, CA (US)

(72) Inventors: Jay Clarke Hanan, West Sacramento, CA (US); Rachel Hess, West Sacramento, CA (US)

(73) Assignee: Origin Materials Operating, Inc., West Sacramento, CA (US)

( * ) Notice: Subject to any disclaimer, the term of this patent is extended or adjusted under 35 U.S.C. 154(b) by 13 days.

(21) Appl. No.: 18/665,442

(22) Filed: May 15, 2024

(65) Prior Publication Data

US 2024/0300199 A1 Sep. 12, 2024

Related U.S. Application Data

(63) Continuation of application No. PCT/US2023/066008, filed on Apr. 20, 2023.

(Continued)

(51) Int. Cl.
B29D 99/00 (2010.01)
B29C 45/00 (2006.01)
(Continued)

(52) U.S. Cl.
CPC ...... B29D 99/0096 (2013.01); B29C 45/0001 (2013.01); B29C 45/0053 (2013.01); B29C 45/26 (2013.01); B29C 51/002 (2013.01); B29C 51/10 (2013.01); B29K 2023/08 (2013.01); B29K 2067/003 (2013.01); B29K 2105/0002 (2013.01); B29K 2105/0085 (2013.01); B29K 2905/02 (2013.01); B29K 2995/0041 (2013.01);
(Continued)

(58) Field of Classification Search
CPC ............ B29D 99/0096; B29C 45/0001; B29C 45/0053; B29C 45/26; B29C 51/002; B29C 51/10; B29C 51/16; B29K 2023/08; B29K 2067/003; B29K 2105/0002; B29K 2105/0085; B29K 2905/02; B29K 2995/0041; B29K 2023/06; B29L 2001/00; B29L 2031/565; B29L 2031/7158; B65D 41/0414; B65D 41/3447; B65D 1/0246; B65D 41/0485; B65D 41/0492; B65D 51/245; B65D 41/005; A61L 2/10; A61L 2/08; B65B 7/2828; B65B 55/08
See application file for complete search history.

(56) References Cited

U.S. PATENT DOCUMENTS

| | | | |
|---|---|---|---|
| 5,131,557 | A | 7/1992 | Stolzman |
| 7,261,226 | B2 | 8/2007 | Adams |

(Continued)

OTHER PUBLICATIONS

International Search Report issued Aug. 15, 2023 in International Application No. PCT/US23/66008.

*Primary Examiner* — Kareen K Thomas
(74) *Attorney, Agent, or Firm* — Greenberg Traurig, LLP

(57) ABSTRACT

Thermoformed polyester resin closures for closing containers, the polyester resins including polyethylene terephthalate ("PET"), polyethylene furandicarboxylate ("PEF"), or a copolymer including PET and PEF, are provided herein. Methods of making the thermoformed closures are further provided. Methods of sterilizing the thermoformed closures are further provided.

43 Claims, 8 Drawing Sheets

Related U.S. Application Data

(60) Provisional application No. 63/340,862, filed on May 11, 2022, provisional application No. 63/333,055, filed on Apr. 20, 2022.

(51) Int. Cl.

| | |
|---|---|
| *B29C 45/26* | (2006.01) |
| *B29C 51/00* | (2006.01) |
| *B29C 51/10* | (2006.01) |
| *B29K 23/00* | (2006.01) |
| *B29K 67/00* | (2006.01) |
| *B29K 105/00* | (2006.01) |
| *B29L 1/00* | (2006.01) |
| *B29L 31/56* | (2006.01) |
| *B65D 41/04* | (2006.01) |
| *B65D 41/34* | (2006.01) |

(52) U.S. Cl.
CPC ..... *B29L 2001/00* (2013.01); *B29L 2031/565* (2013.01); *B65D 41/0414* (2013.01); *B65D 41/3447* (2013.01)

(56) References Cited

U.S. PATENT DOCUMENTS

| | | | |
|---|---|---|---|
| 7,293,981 B2 † | 11/2007 | Niewels | |
| 7,714,094 B2 † | 5/2010 | Sheppard | |
| 9,511,892 B2 † | 12/2016 | Hosokoshiyama | |
| 9,617,050 B2 | 4/2017 | Dreyer | |
| 9,622,563 B2 † | 4/2017 | Collias | |
| 10,086,980 B2 | 10/2018 | Isogai | |
| 11,198,546 B2 | 12/2021 | Guery | |
| 12,214,944 B2 | 2/2025 | Presche | |
| 2001/0027957 A1* | 10/2001 | Kano | B65D 41/3428 |
| | | | 215/354 |
| 2004/0060893 A1† | 4/2004 | Kano | |
| 2004/0069738 A1 | 4/2004 | Orth | |
| 2006/0127615 A1* | 6/2006 | Kikuchi | B29B 11/12 |
| | | | 428/35.7 |
| 2009/0250469 A1 | 10/2009 | Heiberger | |
| 2009/0261057 A1* | 10/2009 | Druitt | B65D 41/045 |
| | | | 264/255 |
| 2010/0089864 A1 | 4/2010 | Fraser | |
| 2010/0092706 A1* | 4/2010 | Clarke | B29C 45/561 |
| | | | 425/150 |
| 2012/0031871 A1 | 2/2012 | Molinaro | |
| 2014/0319093 A1* | 10/2014 | Tsujiguchi | B65D 41/3447 |
| | | | 215/44 |
| 2015/0045485 A1* | 2/2015 | Tsutimoto | C08L 23/06 |
| | | | 525/186 |
| 2015/0353247 A1 | 12/2015 | Isogai | |
| 2016/0193821 A1* | 7/2016 | Sargeant | B29C 48/0018 |
| | | | 528/308.2 |
| 2018/0257822 A1* | 9/2018 | Neputy | B67B 3/20 |
| 2019/0225389 A1 | 7/2019 | Gallay | |
| 2020/0071035 A1* | 3/2020 | Hanan | B29C 49/071 |
| 2022/0009678 A1 | 1/2022 | Goodall | |

\* cited by examiner
† cited by third party

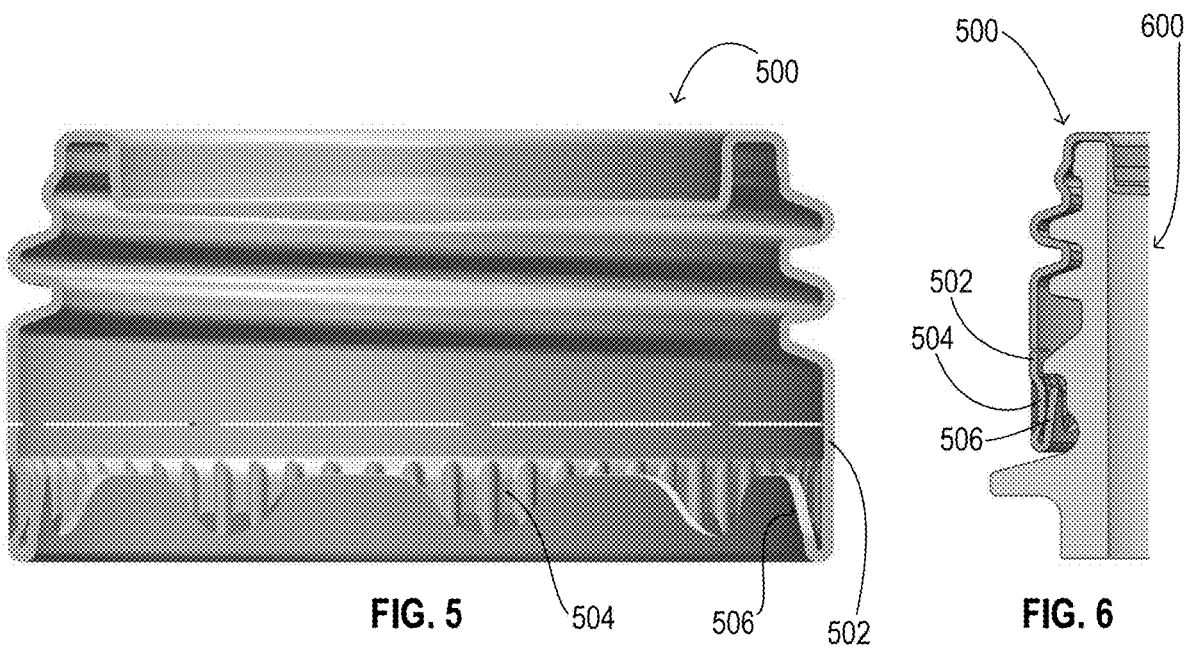
FIG. 5
FIG. 6
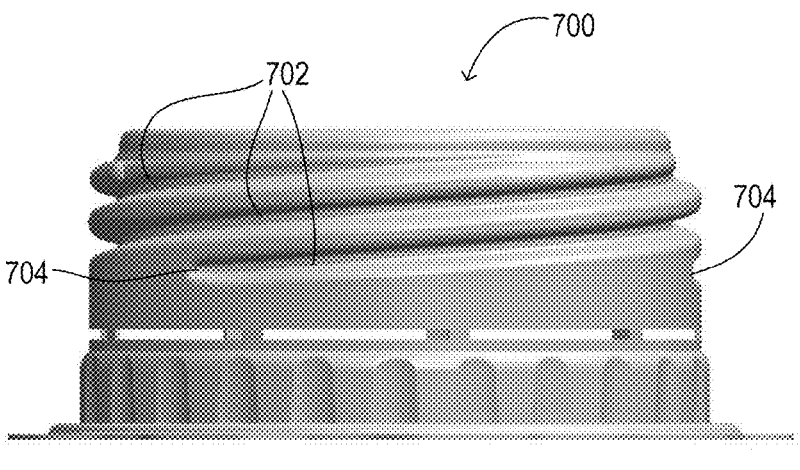
FIG. 7

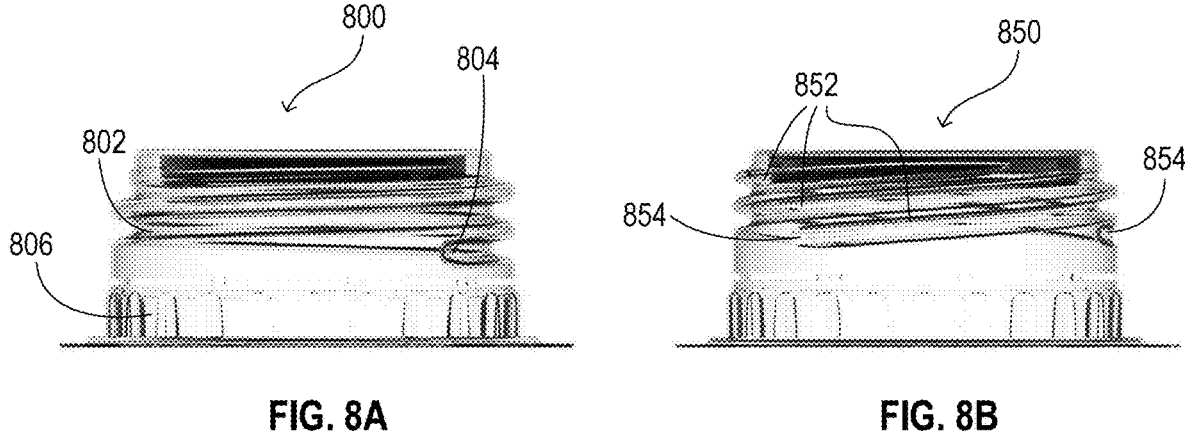
FIG. 8A　　　　　　　　FIG. 8B
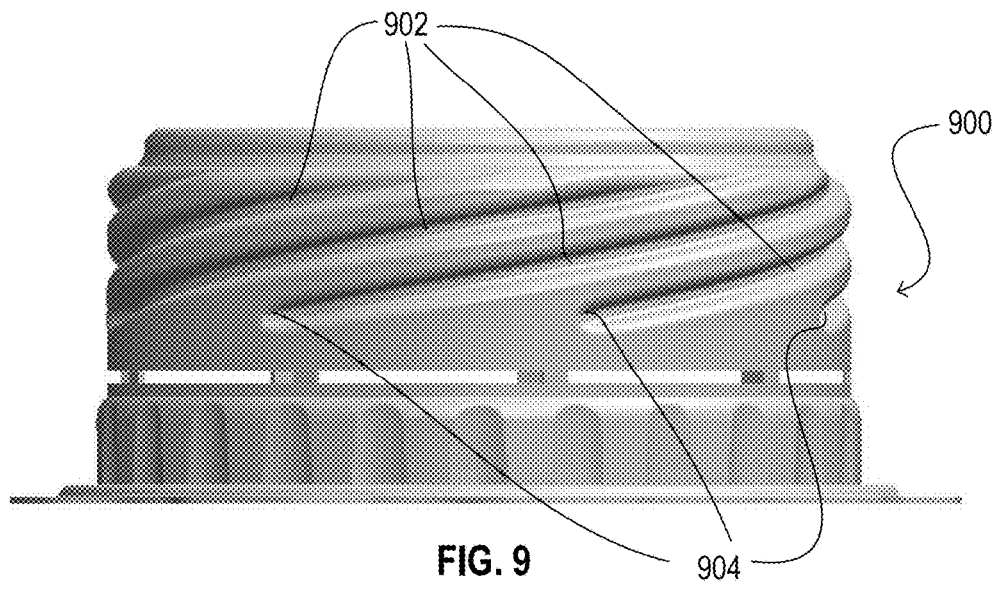
FIG. 9

POLYESTER RESIN CLOSURES FOR CONTAINERS

PRIORITY

This application is a continuation of, and claims the benefit of, PCT Application, entitled "Polyester Resin Closures For Containers," filed on Apr. 20, 2023, and having application serial number PCT/US23/66008, which claims the benefit of, and priority to, U.S. Provisional Application No. 63/333,055, filed on Apr. 20, 2022 and U.S. Provisional Application No. 63/340,862, filed on May 11, 2022, the entirety of each of said applications being incorporated herein by reference.

TECHNICAL FIELD

The present disclosure relates to container closures.

BACKGROUND

Pharmaceutical, beverage, and many other containers are conventionally prepared from polyethylene terephthalate ("PET"), while closures of the containers are conventionally prepared from high-density polyethylene ("HDPE") or polypropylene ("PP") through injection molding. Injection molding of the closures may limit the thinness of the parts of the closures due to flow rate restrictions and ability to eject the closures from the mold. Additionally, the incompatibility of HDPE and PP with the PET recycle stream requires that the closures be sorted away from the associated containers by post-consumer recycling processing facilities. The incompatibility causes unwanted loss and contamination of the PET recycle stream and is exacerbated by the use of automated sensors that detect caps that are reapplied or otherwise attached to valuable PET bottles, sending the bottle off to a mixed plastic or olefin recycling stream. Therefore, there is a need in the art for closures formed from materials that are more readily recyclable.

SUMMARY

In an example, the present disclosure provides a thermoformed polyester resin closure. The closure includes an annular wall that seats against a top surface of a rim of a finish of the container. The closure further includes an outer cylindrical wall that extends downwardly from the annular wall, the outer cylindrical wall including an outer skirt configured to be spaced outwardly from an outer surface of the rim of the finish to provide a clearance between the closure and the outer surface of the finish. The closure further includes an inner cylindrical wall that extends downwardly from the annular wall, the inner cylindrical wall configured such that an outwardly facing surface of the inner cylindrical wall has an interference fit with an inwardly facing surface of the finish of the container for sealing against the inwardly facing surface of the finish. The closure further includes a lower wall that extends across a bottom of the inner cylindrical wall.

In another example, the present disclosure provides a thermoformed resin closure for closing a container including a polyester. The closure includes a top wall that seats against a top surface of a rim of a finish of the container. The closure further includes a cylindrical wall extending downwardly from the top wall and configured such that an inwardly facing surface of the cylindrical wall has an interference fit with an outwardly facing surface of the rim for sealing against the outwardly facing surface of the rim.

In yet another example, the present disclosure provides an injection molded polyester resin closure for closing a container including a polyester, wherein the polyester resin includes polyethylene furandicarboxylate ("PEF").

In yet another example, the present disclosure provides a thermoformed polyester resin closure for closing a container including a polyester. The closure includes an outer layer and an inner layer. The outer layer includes an outer layer annular wall. The outer layer further includes an outer layer outer cylindrical wall that extends downwardly from the outer layer annular wall. The outer layer further includes an outer layer inner depression wall that extends downwardly from the outer layer annual wall. The outer layer further includes an outer layer lower wall that extends across a bottom of the outer layer inner depression wall, the outer layer lower wall including a first shaped downward depression. The inner layer includes an inner layer annular wall. The inner layer includes an inner layer outer cylindrical wall that extends downwardly from the inner layer annular wall. The inner layer includes an inner layer inner depression wall that extends downwardly from the inner layer annular wall, the inner layer depression wall configured such that an outwardly facing surface of the inner layer inner depression wall has an interference fit with an outwardly facing surface of the finish for sealing against the outwardly facing surface of the finish. The inner layer includes an inner layer lower wall that extends across a bottom of the inner layer inner depression wall, the inner layer lower wall including a second shaped downward depression that receives the first shaped downward depression. A lower surface of the first shaped downward depression is configured to confront and lock against an upper surface of the second shaped downward depression.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings. The components in the figures are not necessarily to scale. Moreover, in the figures, like-referenced numerals designate corresponding parts through the different views.

FIG. 5 illustrates a diametrical cross-sectional view of yet another example of a closure including a plurality of internal knurls about a circumference of an inner surface of a tamper evidence feature;

FIG. 6 illustrates a partial diametrical cross-sectional view of the example of a closure of FIG. 5 processed on yet another example of a finish of a container;

FIG. 7 illustrates a side view of yet another example of a closure including a plurality of threads;

FIG. 8A illustrates a side view of yet another example of a closure including one thread and a plurality of knurls distributed circumferentially;

FIG. 8B illustrates a side view of yet another example of a closure including three separate threads and a plurality of knurls distributed circumferentially;

FIG. 9 illustrates a side view of yet another example of a closure including a plurality of threads;

Figure 1:
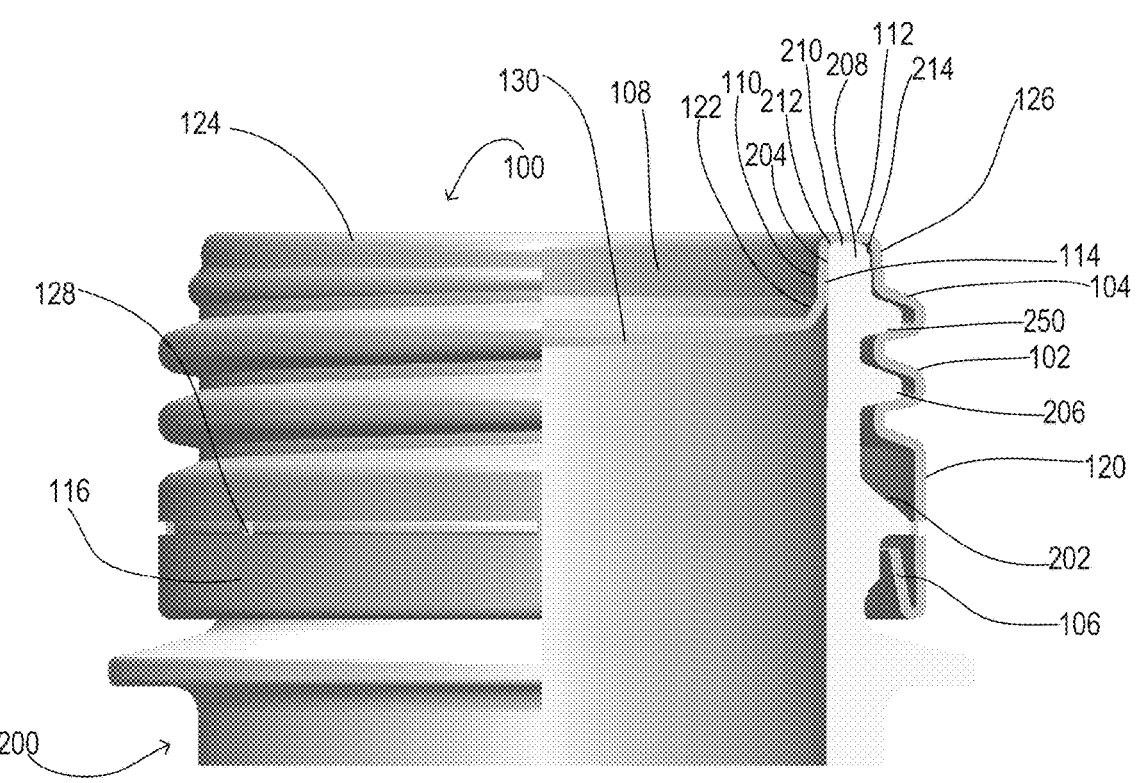
FIG. 1 illustrates a side view with a partial diametrical cross-section of an example of a closure mounted to an example of a finish of a container.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In an example, the present disclosure provides closures formed from a polymer that may be recycled in the same recycling stream as the containers closed by the closures. Examples of suitable polymers from which the closures described herein may be formed may include polyester resins, including bio-modified polyesters, such as co-polymers of PET and polyethylene furandicarboxylate ("PEF," also referred to as "polyethylene 2,5-furandicarboxylate," "polyethylene 2,5-furanoate," or "polyethylene furanoate"), which may include from 0 to 100 mole percent of each of PET and PET (for example, 100 mole percent or less of PET, with the remainder, if any, being PEF), and co-polymers modified by isophthalic acid ("IPA") or other additives or co-monomers. In certain examples, closures may be made of a polyester resin that includes PEF of up to 90 mole percent (0.90 mole fraction) of the polyester resin. In other examples, the PEF may be derived from a reaction of furandicarboxylate ("FDCA") with ethylene glycol, polyethylene glycol ("PEG") and/or diethylene glycol ("DEG"). In still other examples, closures may be made from a polyester resin having a total comonomer content of the reaction product of FDCA with ethylene glycol, PEG, and/or DEG of up to 50 mole percent (0.5 mole fraction) of the polyester resin. The polyester resin may be prepared by a process including melt blending PEF with PET, or by a process that includes reacting ethylene glycol with FDCA. In still other examples, closures may be made by injection molding or compression molding a polyester resin including a total comonomer content of the reaction product of FDCA with ethylene glycol, PEG, and/or DEG of up to 90 mole percent (0.90 mole fraction) of the polyester resin), or up to 50 mole percent (0.50 mole fraction) of the polyester resin, or from 5 to 25 mole percent (from 0.05 to 0.25 mole fraction) of the polyester resin, or from 12 to 15 mole percent (0.12 to 0.15 mole fraction) of the polyester resin. In still other examples, closures may be made by thermoforming a polyester resin having a total comonomer content of the reaction product of FDCA with ethylene glycol, PEG, and/or DEG of up to 50 mole percent (0.50 mole percent) of the polyester resin, or from 0.5 to 20 mole percent (from 0.05 to 0.20 mole fraction) of the polyester resin, or from 1 to 8 mole percent (from 0.01 to 0.08 mole fraction) of the polyester resin. In still other examples, a container may be made of a polyester or polyester resin described herein. A closure comprising a polyester or polyester resin described herein may be shrunk to a finish or thermally or ultrasonically bonded to a finish of a container comprising a polyester or polyester resin described herein. Alternatively, a closure may be heat shrunk to a finish.

In another example, a closure may include a plurality of layers of polyester resins. In certain examples, an inner layer of a plurality of layers may be more compliant than an outer layer of the plurality of layers to more readily deform to the finish, and provide a better seal. Additionally, or alternatively, an outer layer may provide more aesthetic appeal than an inner layer, which may be more functional than an outer layer. Examples of techniques for preparing a closure including a plurality of layers of polyester resins may include thermoforming, compression molding, and injection molding.

As described herein, examples of closures made from polyester resin, such as PET and/or PEF, may have a number of advantages over closures made from conventional materials, such as HDPE and/or PP. For example, the polyester resin closures described herein may help to avoid contaminating a recycle stream and may be made from a high fraction of recycled polyester resin, such as recycled PET ("rPET"). The rPET supply may be cleaner and more readily accessible than HDPE supplies. In certain examples, the polyester resins may be supplemented with bio-based PET ("bio-PET") or virgin-PET. Additionally, or alternatively, another advantage of the polyester resin closures described herein may be that the polyester resin closures may increase the oxygen and carbon dioxide barrier compared to HDPE and PP, thereby increasing the resulting shelf-life of beverages due to the improvement in barrier. In certain examples, an oxygen barrier of closures including PET may be at least 10 times greater than an oxygen barrier of closures made from HDPE. In other examples, the oxygen barrier of closures may even further increase if the closures also include FDCA. Additionally, or alternatively, another advantage of the polyester resin closures described herein may be that the polyester resin closures will not float, and may reduce the tendency of closures to contaminate the environment.

Additionally, or alternatively, another advantage of the polyester resin closures described herein may be that the polyester resin closures may provide for lighter container finishes, which may reduce the cost of materials and the amount of material wasted. Additionally, or alternatively, another advantage of the polyester resin closures described herein may be that because the coefficient of thermal expansion of a polyester resin closure described may closely match the coefficient of thermal expansion of a PET finish of a container, the ability to successfully seal a lighter finish may improve. Additionally, or alternatively, another advantage of the polyester resin closures described herein may be that during a deformation caused by an external force, such as during storage or transportation, a closure and a finish may deform similarly due to the material of the closure and the finish being similar, resulting in the sealing between the closure and finish remaining intact.

Additionally, or alternatively, another advantage of the polyester resin closures described herein may be that because the polyester resin closures are made from a material similar to, or the same as, the container, such as, for example, PET, the closures may be thermally or ultrasonically welded to the finish of the container. In some examples, a polyester resin closure described herein may be welded to a PET finish at one or more locations. In certain examples, a closure may be welded to a top rim of a finish to provide an additional seal between the closure and the finish. In other examples, one or more spot welds may be included so as to provide evidence of lack of tampering. The ability to weld a closure to a PET container may also offer a unique way to meet the tethering requirements of the European Union and considered for the United States. In still other examples, a polyester resin closure described herein may include a tamper-evident ("TE") band, a spiral tether, or another feature such as a hinge that is spot welded at one or more terminal points to the container, providing a tether with controlled strength.

In an example, the closures described herein may require from 10 N to 20 N of force for removal.

In an example, polyester resin closures described herein may be made via a thermoforming process. Thermoformed closures may be designed to balance wall thickness and tuning for an interference fit with container finishes within the elastic limit of PET or any of the other polymers described herein, such as by, for example, including a plug seal or an external seal. Because of the relatively higher stiffness of polyester resins, such as PET, compared to HDPE and PP (for example, on the order of two times higher), the seal designs for conventional HDPE and PP closures may be ineffective for thermoformed polyester resin disclosures described herein, because the seal designs for conventional HDPE and PP closures rely upon a relatively high level of elastic deformation that is generally not achievable with thermoformed polyester resin closures described herein. Accordingly, in certain examples, the seal configurations of thermoformed polyester resin closures may be tailored to provide sufficient sealing with less material strain.

In an example, closures described herein may be made by vacuum forming. In certain examples, closures described herein may be made via pressure-assisted vacuum forming at pressures up to 4 bar, preferably up to 24 bar, and more preferably up to 40 bar. In other examples, a thermoformed polyester resin closure with a plug seal may include a relatively wide sealing surface that may be designed to bridge defects (for example, scratches) that may be present in the finish of a container. By contrast, plug seals of conventional HDPE and PP closures take advantage of the relative softness of the HDPE and PP material and are designed with relatively high levels of elastic deformation that result in relatively smaller areas of sealing contact with the finish. In still other examples, a polyester resin closure described herein, such as a thermoformed polyester resin disclosure, may include a sealing surface of a plug seal with a width of 0.7 millimeters that may be configured for a finish with an inner diameter of 26 millimeters, and a width of 1.5 millimeters that may be configured for a finish with an inner diameter of 48 millimeters.

In an example, a plug seal of a closure described herein may be configured for providing an interference fit with a finish, such that a sealing surface of the closure may provide sufficient pressure against a mating surface of the finish and provide sufficient sealing, including for containing pressurized contents, such as carbonated liquids. An amount of interference may refer to a difference between a radius of a sealing surface of a closure and a corresponding sealing surface of a finish. The amount of interference may vary depending on a diameter of a finish and a wall thickness of a closure. In certain examples, an amount of interference may range from 0.02 millimeters to 0.2 millimeters for material thicknesses in a range of from 0.2 millimeters to 0.5 millimeters. In other examples, an amount of interference for a closure thermoformed from a sheet of PET having a thickness of 0.5 millimeters may be 0.05 millimeters. An amount of interference may be adjusted, for example by changing a behavior of the polyester resin such as by including FDCA and/or DEG, such that a softer polymer may result in a larger interference fit and/or a larger thickness. The values for interference disclosed herein are nominal interference values provided as examples, and variations from the disclosed values may occur due to manufacturing variability.

In an example, a polyester resin closure described herein may be thermoformed from a sheet of polyester resin described herein having a thickness of from 0.20 millimeters to 2.00 millimeters. In certain examples, a sheet of polyester resin may have a thickness of from 0.20 millimeters to 1.95 millimeters, or to 1.90 millimeters, or to 1.85 millimeters, or to 1.80 millimeters, or to 1.75 millimeters, or to 1.70 millimeters, or to 1.65 millimeters, or to 1.60 millimeters, or to 1.55 millimeters, or to 1.50 millimeters, or to 1.45 millimeters, or to 1.40 millimeters, or to 1.35 millimeters, or to 1.30 millimeters, or to 1.25 millimeters, or to 1.20 millimeters, or to 1.15 millimeters, or to 1.10 millimeters, or to 1.05 millimeters, or to 1.00 millimeters, or to 0.95 millimeters, or to 0.90 millimeters, or to 0.85 millimeters, or to 0.80 millimeters, or to 0.75 millimeters, or to 0.70 millimeters, or to 0.65 millimeters, or to 0.60 millimeters, or to 0.55 millimeters, or to 0.50 millimeters, or to 0.45 millimeters, or to 0.40 millimeters, or to 0.35 millimeters, or to 0.30 millimeters, or 0.25 millimeters; or from 0.25 millimeters, or from 0.30 millimeters, or from 0.35 milli-meters, or from 0.40 millimeters, or from 0.45 millimeters, or from 0.50 millimeters, or from 0.55 millimeters, or from 0.60 millimeters, or from 0.65 millimeters, or from 0.70 millimeters, or from 0.75 millimeters, or from 0.80 milli-meters, or from 0.85 millimeters, or from 0.90 millimeters, or from 0.95 millimeters, or from 1.00 millimeters, or from 1.05 millimeters, or from 1.10 millimeters, or from 1.15 millimeters, or from 1.20 millimeters, or from 1.25 milli-meters, or from 1.30 millimeters, or from 1.35 millimeters, or from 1.40 millimeters, or from 1.45 millimeters, or from 1.50 millimeters, or from 1.55 millimeters, or from 1.60 millimeters, or from 1.65 millimeters, or from 1.70 milli-meters, or from 1.75 millimeters, or from 1.80 millimeters, or from 1.85 millimeters, or from 1.90 millimeters, or from 1.95 millimeters to 2.00 millimeters; or any range that may be formed from any two of the foregoing numbers, including any subranges therebetween. Preferably, a sheet of polyester resin may have a thickness of from 0.50 millimeters to 0.90 millimeters, including any of 0.50 millimeters, 0.55 milli-meters, 0.60 millimeters, 0.65 millimeters, 0.70 millimeters, 0.75 millimeters, 0.80 millimeters, 0.85 millimeters, or 0.90 millimeters, including any ranges or subranges therebe-tween. In other examples, a desirable or preferable thickness of a sheet of a polyester resin described herein used to prepare a polyester resin closure described herein may be a determinable function of a diameter of a polyester resin closure.

In an example, so as to enable a plug seal of a closure described herein to deform when engaging a finish, a ther-moformed polyester resin closure may be configured with sufficient radial clearance between an outer surface of the finish and an outer wall of the closure, which encloses the outer surface of the finish. Without a radial clearance, a plug seal of a closure may not be able to fully insert within a finish, or stress on a closure may be high enough to cause failure.

In an example, a thermoformed polyester resin closure described herein may be configured with an external seal that seals with an outer surface of a mouth of a finish. The external seal may be achieved with an interference fit with the finish. An amount of interference may depend on the application. Examples of interferences and wall thicknesses disclosed above for the plug seal may be used for the external seal. In certain examples, a sealing of the external seal may be enhanced by taking advantage of an ability of a polyester resin to heat shrink by heat shrinking a closure after capping.

To achieve a suitable interference of a seal, such as a plug seal and/or an external seal, with the finish, and in certain examples, a suitable clearance between an outer wall of a closure and a finish, the dimensions of the interference and the clearance may be well controlled during manufacture by thermoforming a closure using a male mold that matches a shape of a desired interference with the finish while account-ing for shrinkage. The features of the closure that may provide the interference and clearance with the finish may be in contact with the mold.

Because thermoformed polyester resins are relatively stiff, a sealing surface of a polyester resin closure may have a relatively low surface roughness. In certain examples, a low surface roughness may be achieved by polishing regions of a thermoforming mold that form the sealing surfaces. In other examples, portions of a thermoforming mold that do not form the sealing surfaces of the closure are not polished, or are not polished to the same degree as portions that do form the sealing surface so as to avoid a closure sticking to the mold and being difficult to release. Examples of a roughness of sealing surface(s) of a closure may include about 0.2 microns (an Ra value of 0.2 or an N4 finish).

In various examples, a seal, a thread-engagement, and/or a TE band of a polyester resin disclosure described herein may be configured to provide an opening torque in a range of from 0.45 N-m to 1.24 N-m, and preferably 1.02 N-m. In various examples, a closure may be configured to provide a pressure retention of less than or equal to 2 bar, and preferably less than or equal to 10 bar.

In an example, a polyester resin used in thermoformed closures described herein may include some amount of FDCA and/or DEG, which may provide numerous advan-tages. For example, FDCA and DEG may interfere with crystal formation, so resulting material may have a longer processing window in which to form features on the closure. Additionally, including FDCA and/or DEG may make mate-rial of a closure sufficiently different from material of a finish such that the closure does not fuse to the container during storage. Additionally, including FDCA and/or DEG may lower a modulus of material of a closure, which may allow for higher material strains, and higher material strains may be useful for increasing a seal between a closure and a finish.

In an example, a closure may be made by injection molding or compression molding a polymer resin. In certain examples, the polyester resin may include some amount of FDCA and/or DEG. The FDCA and/or DEG content may sufficiently reduce the modulus of the material such that a closure may easily eject from various cavities of a mold. For example, a modulus of the amorphous phase of the material may be in the range of 1 to 3 GPa. An increased FDCA content may increase the processing window such that ejection of a closure is easier, because the polyester resin may remain soft for a longer period of time. The amount of FDCA and/or DEG in a polyester resin that is submitted to injection molding or compression molding may be relatively higher than an amount of FDCA and/or DEG in a thermo-formed closure because of a need for greater compliance in injection molding or compression molding. In certain examples, an ability of a material to flow during injection molding or compression molding may be increased by limiting an intrinsic viscosity of the material. Examples of methods of limiting an intrinsic viscosity of the material may include limiting the duration of solid-state polymeriza-tion of the polyester resin after synthesizing the polyester resin. In certain examples, an intrinsic viscosity may be in a range of from 0.4 dL/g to 0.7 dL/g. A higher intrinsic viscosity may lead to more toughness in the final closure. In certain examples, an intrinsic viscosity in the range of from 0.8 dL/g to 1.2 dL/g may be beneficial for toughness. A bimodal resin may provide benefits from both of a low viscosity polyester and a high viscosity polyester to impart both beneficial flow and toughness characteristics. Similar to thermoformed closures, by including FDCA and/or DEG in a polyester resin closure described herein, the closure mate-rial may be made sufficiently different from a finish material such that the closure may not fuse to the container during storage. Further, by including FDCA and/or DEG in a polyester resin closure described herein, the modulus of the closure material may be lowered, which may allow for higher material strains, and which may increase the seal between the closure and the finish. Further, by including FDCA and/or DEG in a polyester resin closure described herein, the co-monomers may also lower the melting point, allowing reduced energy for bonding or intentional sealing using heat as is used with inductive seals on metalized film.

In an example, a movable core component may be used in injection molding or compression molding in order to reduce the need of warm threads so as to strip stiff PET, which is conventionally performed with injection molded HDPE. In certain examples, an FDCA-, PEG-, and/or DEG-modified polyester resin may be used in combination with a movable core.

In certain examples, closures may be colored using dye or dyeing processes that are compatible with recycling. For example, a dye used to color a closure may be compatible with recycling. In other examples, a dye or an ink may be removable via washing. In still other examples, a nanocoating may be deposited on a surface of a closure.

Closures may be configured to fit custom or industry standard finishes. Examples of industry standard thread finishes may include 26/22, 29/25, 29/21, 28PCO1881, 30/25, 38/33, and 48 mm.

Closures Made of Copolymers of PET and PEF ("PETF")

In an example, a closure may be made of a PET-based copolymer that may be particularly suited for injection molding and/or thermoforming. The PET-based copolymer incorporates a co-monomer to control crystallization and reduce melt processing temperatures. In certain examples, the present disclosure provides a copolymer of PET and PET (also referred to as a FDCA-modified PET copolymer, or "PETF"). In other examples, the FDCA may be incorporated at a range of amounts such as to enhance the polymer reaction rates during both melt and solid state polymerization, and such as to allow polymer performance that may match traditional PET controlled by adding an amount of IPA. In still other examples, FDCA may be substituted for or added to PET in addition to IPA so as to make PETF. In still other examples, FDCA may be added in a low fraction, and the PETF copolymer product may be made following the same process as to make PET.

In an example, the present disclosure provides a FDCA-modified PET copolymer that incorporates FDCA at an amount that may allow appropriate retardation of crystal formation in PET during closure forming. In certain examples, the PETF may include less than 10 mole % FDCA, or less than 9 mole % FDCA, or less than 8 mole % FDCA, or less than 7 mole % FDCA, or less than 6 mole % FDCA, or less than 5 mole % FDCA, or less than 4 mole % FDCA, or less than 3 mole % FDCA, or less than 2 mole %, or less than 1 mole % FDCA, or an amount in a range formed from any two of the foregoing numbers, including all ranges and subranges therebetween. In other examples, the PETF may include as low as 0.5 mole % FDCA, and retard crystal formation sufficiently. In still other examples, the PETF may include from 0.5 mole % to 5 mole % FDCA, of from 0.5 mole % to 4 mole % FDCA, or from 0.5 mole % to 3 mole % FDCA, or from 0.5 mole % to 2 mole % FDCA, or from 1 mole % to 5 mole % FDCA, or from 1 mole % to 4 mole % FDCA, or from 1 mole % to 3 mole % FDCA, or from 1 mole % to 2 mole % FDCA; or about 1.1 mole % FDCA, or about 1.2 mole % FDCA, or about 1.3 mole % FDCA, or about 1.4 mole % FDCA, or about 1.5 mol % FDCA, or about 1.7 mol % FDCA, or about 1.8 mol % FDCA, or about 1.9 mol % FDCA, or about 2 mol % FDCA, or an amount in a range formed from any two of the foregoing numbers, including all ranges and subranges therebetween.

In an example, the copolymers provided herein may include repeating units (L), (M), and (N), or any salts thereof:

Repeating unit (L) may be a polyethylene furanoate ("PEF") repeating unit based on furandicarboxylic acid (FDCA). In an example, repeating unit (L) may be present in an amount of from 0.5 mol % to 90.0 mol %, or to 85.0 mol %, or to 80.0 mol %, or to 75.0 mol %, or to 70.0 mol %, or to 65.0 mol %, or to 60.0 mol %, or to 55.0 mol %, or to 50.0 mol %, or to 45.0 mol %, or to 40.0 mol %, or to 35.0 mol %, or to 30.0 mol %, or to 25.0 mol %, or to 20.0 mol %, or to 15.0 mol %, or to 10.0 mol %, or to 9.5 mol %, or to 9.0 mol %, or to 8.5 mol %, or to 8.0 mol %, or to 7.5 mol %, or to 7.0 mol %, or to 6.5 mol %, or to 6.0 mol % of the copolymer; or from 6.5 mol %, or from 7.0 mol %, or from 7.5 mol %, or from 8.0 mol %, or from 8.5 mol %, or from 9.0 mol %, or from 9.5 mol %, or from 10.0 mol %, or from 15.0 mol %, or from 20.0 mol %, or from 25.0 mol %, or from 30.0 mol %, or from 35.0 mol %, or from 40.0 mol %, or from 45.0 mol %, or from 50.0 mol %, or from 55.0 mol %, or from 60.0 mol %, or from 65.0 mol %, or from 70.0 mol %, or from 75.0 mol %, or from 80.0 mol %, or from 85.0 mol % to 90.0 mol % of the copolymer; or any range made from any two of the foregoing numbers, including any subranges therebetween. In certain examples, repeating unit (L) may be present in an amount of from 0.5 mol % to 6.0 mol % of the copolymer, including all subranges therebetween. In other examples, repeating unit (L) may be present in an amount of up to 90.0 mol % of the copolymer. As the mole percent of FDCA is increased, the rate and degree of crystallization of PET may decrease.

Repeating unit (M) is may be based on terephthalic acid ("PTA" or "TPA"). In an example, repeating unit (M) may be present in an amount of from 10.0 mol % to 99.5 mol %, or to 99.0 mol %, or to 98.5 mol %, or to 98.0 mol %, or to 97.5 mol %, or to 97.0 mol %, or to 96.5 mol %, or to 96.0 mol %, or to 95.5 mol %, or to 95.0 mol %, or to 94.5 mol %, or to 94.0 mol %, or to 93.5 mol %, or to 93.0 mol %, or to 92.5 mol %, or to 92.0 mol %, or to 91.5 mol %, or to 91.0 mol %, or to 90.5 mol %, or to 90.0 mol %, or to 85.0 mol %, or to 80.0 mol %, or to 75.0 mol %, or to 70.0 mol %, or to 65.0 mol %, or to 60.0 mol %, or to 55.0 mol %, or to 50.0 mol %, or to 45.0 mol %, or to 40.0 mol %, or to 35.0 mol %, or to 30.0 mol %, or to 25.0 mol %, or to 20.0 mol %, or to 15.0 mol %, or to 10.0 mol %; or from 10.0 mol %, or from 15.0 mol %, or from 20.0 mol %, or from 25.0 mol %, or from 30.0 mol %, or from 35.0 mol %, or from 40.0 mol %, or from 45.0 mol %, or from 50.0 mol %, or from 55.0 mol %, or from 60.0 mol %, or from 65.0 mol %, or from 70.0 mol %, or from 75.0 mol %, or from 80.0 mol %, or from 85.0 mol %, or from 90.0 mol %, or from 90.5 mol %, or from 91.0 mol %, or from 91.5 mol %, or from 92.0 mol %, or from 92.5 mol %, or from 93.0 mol %, or from 93.5 mol %, or from 94.0 mol %, or from 94.5 mol %, or from 95.0 mol %, or from 95.5 mol %, or from 96.0 mol %, or from 96.5 mol %, or from 97.0 mol %, or from 97.5 mol %, or from 98.0 mol %, or from 98.5 mol % to 90.0 mol %; or any range made from any two of the foregoing numbers, including any subranges therebetween. In certain examples, repeating unit (M) may be present in an amount of from 94 mol % to 99.5 mol %, including all subranges therebetween. In other examples, repeating unit (M) may be present in at least 10.0 mol % of the copolymer.

Repeating unit (N) is based on IPA, and may be optional. In certain examples, repeating unit (N) may be present in an amount of from 0 mol % to 4 mol %, including all subranges therebetween.

In an example, the FDCA-modified PET copolymers described herein may act as a polymerization/melt-processing aid and may lead to several processing advantages, including, for example: improving the melt-phase polymerization times and/or process temperatures; allowing lower melt phase processing temperatures, which may reduce thermal degradation by-products and may improve b* (yellow) color of the copolymer; as FDCA concentration increases, decreasing process temperatures and protecting the polymer from thermal degradation by-products that may be associated with FDCA polymers produced at typical, unmodified PET process temperatures; reducing the melt temperatures of the copolymer to allow lower processing temperatures in closure forming; reducing the melt temperatures without reducing the melt viscosity in closure forming; producing polymers with high intrinsic viscosity ("IV") at polymerization times and temperatures associated with unmodified PET; and/or producing high IV polymers with high IV at solid-state polymerization times and temperatures associated with unmodified PET.

In an example, crystal nucleation in PETF including FDCA in amounts of <2 mol % may be accelerated by nano-particles that have the ability to nucleate crystals in PET. In another example, the rate nucleation of PETF including FDCA in amounts of >2 mol %, and even over 5 mol %, may be increased by using crystallization additives such as graphene.

In an example, a PEF component may have less entanglement density than PET.

In an example, the PETF provided herein may have low PEF yellowing due to low FDCA fractions used.

In an example, pellet blending for PETF concentration may be another route to PET with a low mole percent of FDCA.

In an example, PETF for use in the polyester resin closures described herein may be made by esterification of ethylene glycol ("EG") and PTA in the presence of FDCA and optionally IPA. In certain examples, FDCA may be present in a range of from 0.05 mol % to 6 mol %, or from 1.5 mol % to 2 mol %, including all ranges and subranges therebetween. In other examples of PETF, in which IPA is also incorporated, IPA may be present in a range of from 0.01 mol % to 2 mol %, including all subranges therebetween.

PTA-Based Melt Polymer Process

In an example, the initial reaction of the PTA-based polymer process may react PTA with EG under a pressure of 40-50 psig at 250-270° C. Water may be evolved and separated using a distillation column. The reaction may be carried out under pressure because of the low solubility of PTA in EG at the boiling point of EG of 197° C. After most of the theoretical amount of water has been collected, the pressure may be reduced to atmospheric as the remaining water is evolved. The resulting bis(2-hydroxyethyl) terephthalate ("BHET") may be heated in the presence of a suitable catalyst (such as antimony triglycolate), and EG is extracted in a kind of ester-interchange as two molecules of BHET form a dimer. If the released EG is removed from the system by distillation, further reactions may be possible. In certain examples, a dimer may react with another BHET molecule to form a trimer; two molecules of dimer may form a tetramer. By such stepwise growth process, a high-molecular-weight polymer may be produced.

In certain examples, suitable catalysts used for PET polymerization may include Sb- and Ti-based catalysts. In other examples, phosphoric acid and phosphates may be added to perform one or more of several roles, including, for example to serve as a catalyst or to minimize thermal oxidation. In still other examples, impurities in PTA may be less than 1 ppm of one or more of Fe, Co, Mo, Ni, Ti, Cr, Ca, Al, MG, Na, and K. Impurities of greater quantity may be present in PTA, and the impurities may act as chain terminators or cause discoloration.

For melt-phase polymerization, high temperatures, such as from 265 to 300° C., may be required, and the pressure above the melt polymer must be reduced to approximately 1 torr so as to facilitate the high molecular weights required for polymer performance. In production plants, multi-stage steam or glycol ejectors may be used to achieve the low pressure of approximately 1 torr.

PTA-Based Solid-State Polymerization ("SSP")

Polyesters may be polymerized in the solid state as well as in the melt phase. In an example, to achieve solid-state polymerization, the polymer chip produced in the melt polymer process may be heated to high temperatures, such as from 200 to 210° C., under vacuum or in a stream of inert gas, such as nitrogen. The SSP process may allow high molecular weights to be achieved without the problems associated with processing hot, extremely viscous melts. Further, because the reaction temperature of the SSP process is lower than melt polymerization, thermal degradation of the polymer may be minimal.

During melt polymerization, degradation reactions may lead to the formation of acetaldehyde ("AA") and carboxyl end groups. The SSP process acts as a "cleaning" process that may remove the melt phase degradation products and may reduce AA levels in polymer chips to 1 ppm or lower. Reduction of AA levels may be important for polymers used to make food-grade bottles destined to contain sodas and water, because even trace amounts of AA may produce off-flavors.

The main reaction in SSP is polyesterification, a result of the dehydration reaction between carboxyl and hydroxyl end groups on the polymer chains. The results of the polyesterification process gives SSP the ability to increase the viscosity and reduce the carboxyl end group ("CEG") level in the polymer, both of which may be desirable properties in downstream applications. Furthermore, SSP also removes the cyclic oligomers formed in the melt phase polymers that may cause deposition problems in downstream polymer applications.

The rate of SSP may be governed by the diffusion of water and glycol out of the polymer chip and/or the rate of removal of AA. The reaction rate may be highly dependent upon a size of a polymer chip and there may be a molecular weight gradient from a surface to a center of a polymer chip.

In an example, toners may be used to adjust a color of the resulting PETF.

In an example, PETF for closures may be produced by melt mixing or blending pellets including FDCA in higher concentrations with PET that does not include FDCA. In certain examples, 10 mol % PET including an FDCA content of 10% blended with 90 mol % PET without FDCA yields PET including 1% FDCA.

Thermoformed PET Closure with Plug Seal

Referring to FIG. 1, a side view with partial diametrical cross section of an example of a thermoformed polyester resin closure 100 mounted to an example of a finish 200 of a container typically used for storing liquid contents, such as still or carbonated drinks, is illustrated. Closure 100 may be made of any of the polyester resins described herein. Closure 100 includes internal threads 102 formed into outer cylindrical wall 104 of closure 100 for engaging with external threads 206 of finish 200. The threads 206 may be continuous threads or may be interrupted threads. Other examples may be configured for snap-on engagement with finish 200. Outer cylindrical wall 104 extends downwardly from annular wall 112.

Closure 100 includes plug seal 108 for sealing against inner surface 204 of finish 200. Plug seal 108 includes cylindrical wall 110 that extends downwardly from annular wall 112 of closure 100. Annular wall 112 may be configured to seat against top surface 210 of rim 208 of finish 200. Outwardly facing radical surface 114 of inner cylindrical wall 110 of plug seal 108 may be dimensioned for an interference fit with the corresponding inwardly facing surface 204 of rim 208 of finish 200 for sealing. In certain examples, an interference fit may be 0.05 millimeters for a wall thickness of 0.5 millimeters. As closure 100 is threaded onto finish 200, plug seal 108 is forced into the mouth of finish 200 into a compressed state in which outwardly facing radial surface 114 of plug seal 108 pushes against inwardly facing surface 204 of finish 200, forming a seal, the mouth being the open volume between diametrically opposing inwardly facing surfaces 204 of rim 208 of finish 200. Inner cylindrical wall 110 extends downwardly from annular wall 112 to lower wall 120. The degree of interference fit and dimensions of plug seal 108 and finish 200 determine the sealing force and, thus, these parameters may be adjusted to adjust the degree of sealing force for a given application. The interference fit between plug seal 108 and finish 200 may serve as a locking feature for locking closure 100 to finish 200. Plug seal 108 may include chamfer 122 for guiding plug seal 108 past lip 212 of the mouth of finish 200 as closure 200 is capped onto the container.

Plug seal 108 may be configured to have a relatively wide sealing interface with finish 200, the sealing interface being the contact area between outwardly facing radial surface 114 and inwardly facing surface 204 of finish 200, the sealing interface being designed to bridge defects (for example, scratches) that may be present in finish 200. An example width for the contact area between outwardly facing radial surface 114 and inwardly facing surface of the finish for finish 200 with an inner diameter of 26 millimeters may be 0.7 millimeters, and for finish 200 with an inner diameter of 48 millimeters may be 1.5 millimeters.

To enable closure 200 to elastically deform in the region of plug seal 108, closure 200 may be designed for a clearance between outer skirt 126 of outer cylindrical wall 104 of closure 100 and corresponding outer surface 214 of rim 208 of finish 200. The amount of clearance may be at least as much as the amount of interference of plug seal 108 with finish 200. For example, the amount of clearance may be 0.05 millimeters or more for an interference of 0.05 millimeters.

An interference fit 250 may be provided for threads 102 to ensure that closure 100 is tightly fitted to finish 200. An exemplary interference fit is 0.05 millimeters. Interference fit 324 of threads 102 may also serve as locking feature for locking closure 100 to finish 200. The interference may increase with reduction of the modulus of the material of closure 100.

Closure 100 includes tamper evidence feature 116, which in FIG. 1 is illustrated in the form of folded band 106 that engages with a tamper evidence ledge 202 of finish 200. As closure 100 is threaded onto finish 200, folded band 106 rides over ledge 202, and once folded band 106 has cleared ledge 202, fits into place beneath ledge 202, as illustrated in FIG. 1. Tamper evidence feature 116 may include a plurality of spaced-apart bridges 128 that connect folded band 106 to main body 124 of closure 100. In the event that closure 100 is unthreaded from finish 200, folded band 106 will be retained in position by ledge 202. The upward force from unthreading of closure 100 will eventually cause sufficient stress on bridges 128 that they will break, providing evidence that closure 100 has been tampered with.

Optionally, one or more of bridges 128 may be dimensioned such that its or their breaking stress is greater than the breaking stress of remaining bridges 128 such that the one or more bridges 128 will remain intact to provide a tether to keep closure 100 attached to the bottle upon removal.

In certain examples of closure 100, a pull tab may be included in place of folded band 106 as tamper evidence feature 116. The pull tab may be configured such that the pull tab must be at least partially removed in order to disengage closure 100 from finish 200.

Closure 100 may be thermoformed with a sheet of PET (or any of the materials described herein) with a thickness of 0.22 millimeters to 1.0 millimeters, preferably about 0.5 millimeters.

In other examples, the interface between annular wall 112 and top surface 210 of rim 208 of finish 200 may serve as a secondary seal. In still other examples, the secondary seal may be formed and/or enhanced by welding the two surfaces together, such as ultrasonically or via direct application of heat.

In still other examples, the portion of closure 100 with the greatest diameter is cylindrical in shape without any significant outwardly projecting interruptions in the general cylindrical shape. For example, as illustrated in FIG. 1, lower outer wall 120 of outer cylindrical wall 104 of main body 124, which is at the greatest diameter of closure 100, may be vertical, which may enable the use of conventional capping equipment, which is typically designed to grip onto cylindrical shapes.

Lower wall 130 extends across a bottom of inner cylindrical wall 110. In certain examples, lower wall 130 may have a concave upward shape as illustrated in the example in FIG. 1 that, when pressure is applied (upward against lower wall 130 from pressurized contents of the container that closure 100 closes, becoming convex downward. A change in shape may result in the pressure applied to lower wall 130 increasing the pressure on the sealing interface between plug seal 108 and finish 200. In other examples, lower wall 130 may include one or more ridges, such as cylindrical ridges, or other features to control a shape that lower wall 130 may form when under pressure.

Thermoformed polyester resin closures may be configured with an external seal instead of or in addition to a plug seal. External seals may be easier to thermoform than plug seals, and may provide sufficient sealing for at least some beverages. Optionally, a heat shrinking step may be used to solidify the external seal of the closure.

Figure 2:
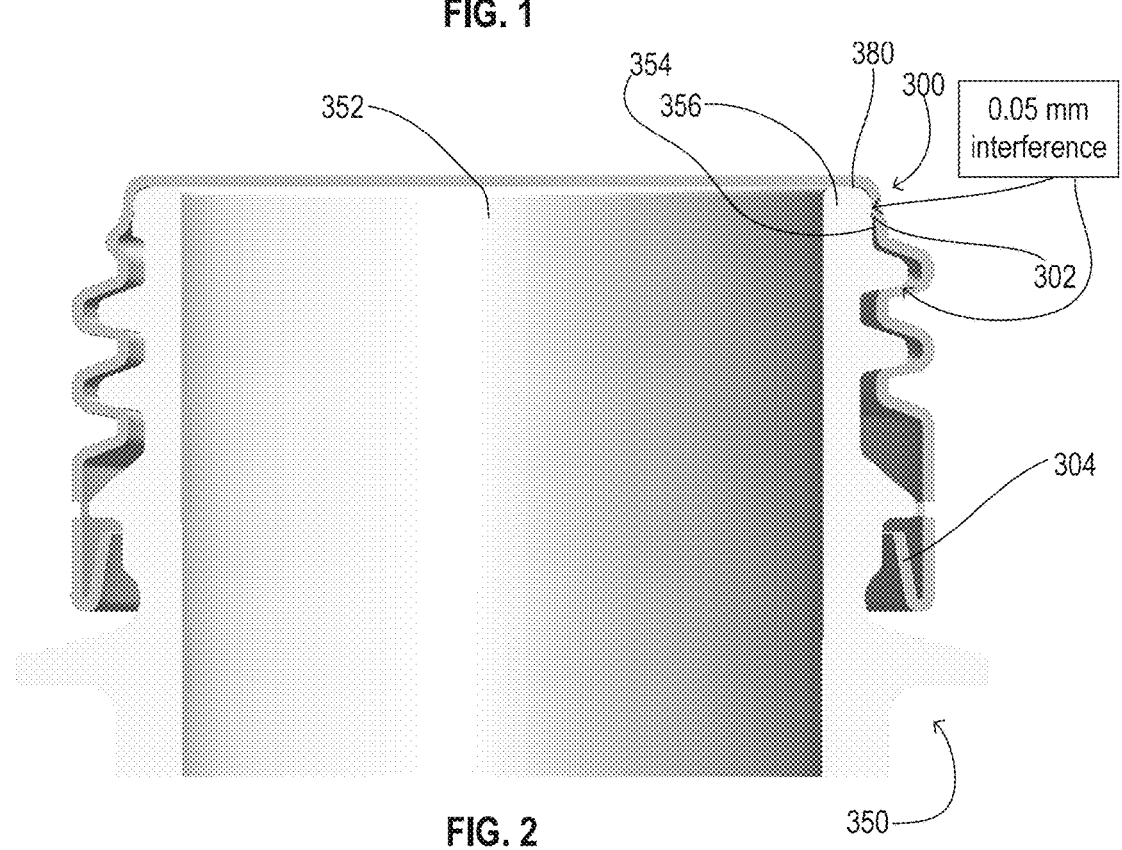
FIG. 2 illustrates a diametrical cross-sectional view of another example of a closure including an external seal for sealing to another example of a finish of a container.

Referring to FIG. 2, a diametrical cross-sectional view of another example of a thermoformed resin closure 300 that includes external seal 380 for sealing to finish 350 of a container is illustrated. Closure 300 may be made of any of the polyester resins described herein. External seal 380 may be provided by an interference fit between an inner surface 302 of the top end of closure 300 and outer surface 354 of mouth 352 of finish 350. An exemplary interference fit may be 0.05 milliliters.

Similar to closure 100 illustrated in FIG. 1, closure 300 may be configured for threaded engagement with finish 350 or may be configured for a snap-on pressure fit engagement with finish 350. Closure 300 may also include a tamper evidence feature such as folded band 304 like folded band 106 in closure 100.

Figure 3:
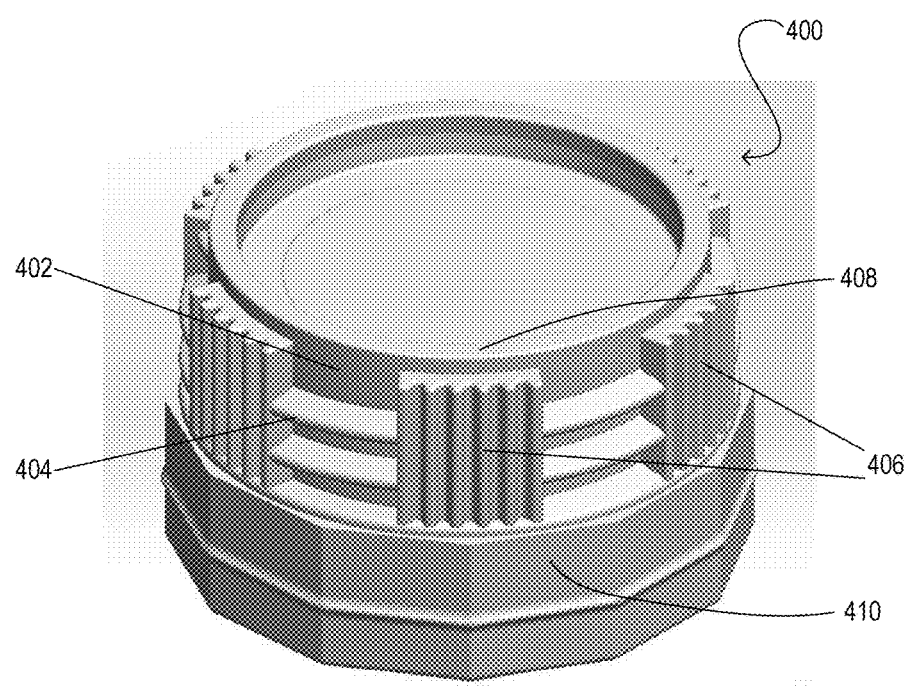
FIG. 3 illustrates a perspective view of yet another example of a closure.

Referring to FIG. 3, a perspective view of yet another example of a closure 400 is illustrated. Outer wall 402 of closure 400 includes a plurality of threaded portions 404 equally distributed around outer wall 402. In between each of the plurality of threaded portions is each of a plurality of knurled portions 406, the plurality of knurled portions 406 equally distributed around outer wall 402. The knurls (or "ridges") of the plurality of knurled portions 406 may be axial, and extend at least part of the way between annular wall 408 and lower outer wall 410.

Figures 4A, 4B:
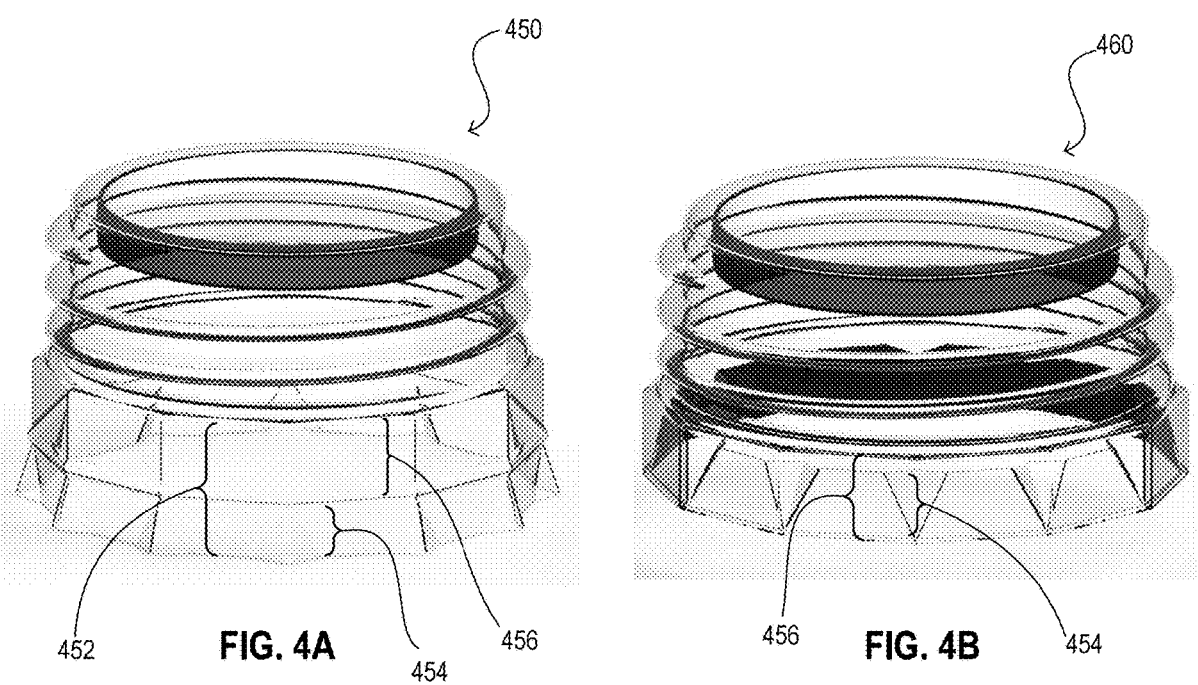
FIG. 4A illustrates a perspective view of yet another example of a closure that is formed but not fully processed about a finish of a container.
FIG. 4B illustrates a perspective view of the example of a closure of FIG. 4A that has been fully processed about a finish of a container.

Referring to FIG. 4A, a perspective view of yet another example of a closure 450, which is formed but not fully processed about a finish of a container, is illustrated. Lower wall 452 includes tamper evidence feature 456 and folded band 454 that has not been processed to fold behind tamper evidence feature 456 and under a ledge of a finish (not shown). FIG. 4B illustrates a perspective view of yet another example of a closure 460 that has been fully processed with folded band 454 processed to fold behind tamper evidence feature 456 and under a ledge of a finish (not shown).

Referring to FIG. 5, a diametrical cross-sectional view of yet another example of a closure 500 including a plurality of internal knurls 504 about the circumference of an inner surface of tamper evidence feature 502. Plurality of internal knurls 504 may be distributed evenly or unevenly about the circumference of the inner surface of tamper evidence feature 502. Plurality of internal knurls 504 may result in unconventional handling by contacting a surface of folded band 506 when closure 500 is processed on a finish of a container. Surface contact of plurality of internal knurls 504 may be in contrast to a conventional method of surface contact with knurls on an external surface of a closure, and, specifically, not a surface of a tamper evidence band. Both internal and external knurls are possible with closures described herein, but plurality of internal knurls 504 may be easier to form in thermoformed closures described herein.

Referring to FIG. 6, a partial diametrical cross-sectional view of the example of closure 500 illustrated in FIG. 5 processed on a finish 600 of a container is illustrated. As illustrated in FIG. 6, a surface of folded band 506 is in contact with plurality of internal knurls 504 of tamper evidence feature 502.

Referring to FIG. 7, a perspective view of yet another example of a closure 700 is illustrated. Closure 700 includes a tamper evidence feature including a folded band 702 that is folded outward around outer wall 706 of closure 700. Folded band 702 includes a plurality of slits 704 that are evenly distributed circumferentially about folded band 702.

Referring to FIG. 7, a side view of yet another example of a closure 700 is illustrated. Closure 700 includes a plurality of threads 702 evenly distributed about a side wall of closure 700, each distinct thread of the plurality of threads 702 including one of a corresponding plurality of thread starts 704.

Referring to FIG. 8A, a side view of yet another example of a closure 800 is illustrated. Closure 800 includes one thread 802, with one thread start 804 at the beginning of thread 802. Tamper evidence feature 806 includes a plurality of knurls distributed circumferentially about closure 800. The plurality of knurls may be distributed evenly or unevenly circumferentially about closure 800. FIG. 8B illustrates a side view of yet another example of a closure 850. Closure 850 includes a plurality of threads 852, such as, for example, three threads distributed evenly about the side wall of closure 850. Each of the plurality of threads 852 includes one of a corresponding plurality of thread starts 854. In certain examples, an example of closure 800 may be compatible with industry standard container finish PCO 1881. In other examples, an example of closure 850 may be compatible with industry standard container finish 26/22 mm. FIGS. 8A and 8B illustrate that closures 800, 850 may be prepared from polyester resins described herein for a variety of finish formats with a range of numbers of thread starts and in a range of sizes.

Referring to FIG. 9, a side view of yet another example of a closure 900 is illustrated. Closure 900 includes a plurality of threads 902, each of which includes one of a corresponding plurality of thread starts 904. In certain examples, plurality of threads 902 may include three, four, five, six, seven, eight, nine, ten, eleven, twelve, or more distinct threads, corresponding, respectively, to a plurality of thread starts 904, which may include three, four, five, six, seven, eight, nine, ten, eleven, twelve, or more distinct thread starts in a number that equals the number of threads. Plurality of threads 902 may allow snap-on application of closure 900 to a finish of a container, and twist-off removal of closure 900 from the finish.

Figures 10A, 10B, 10C, 11A, 11B, 11C:
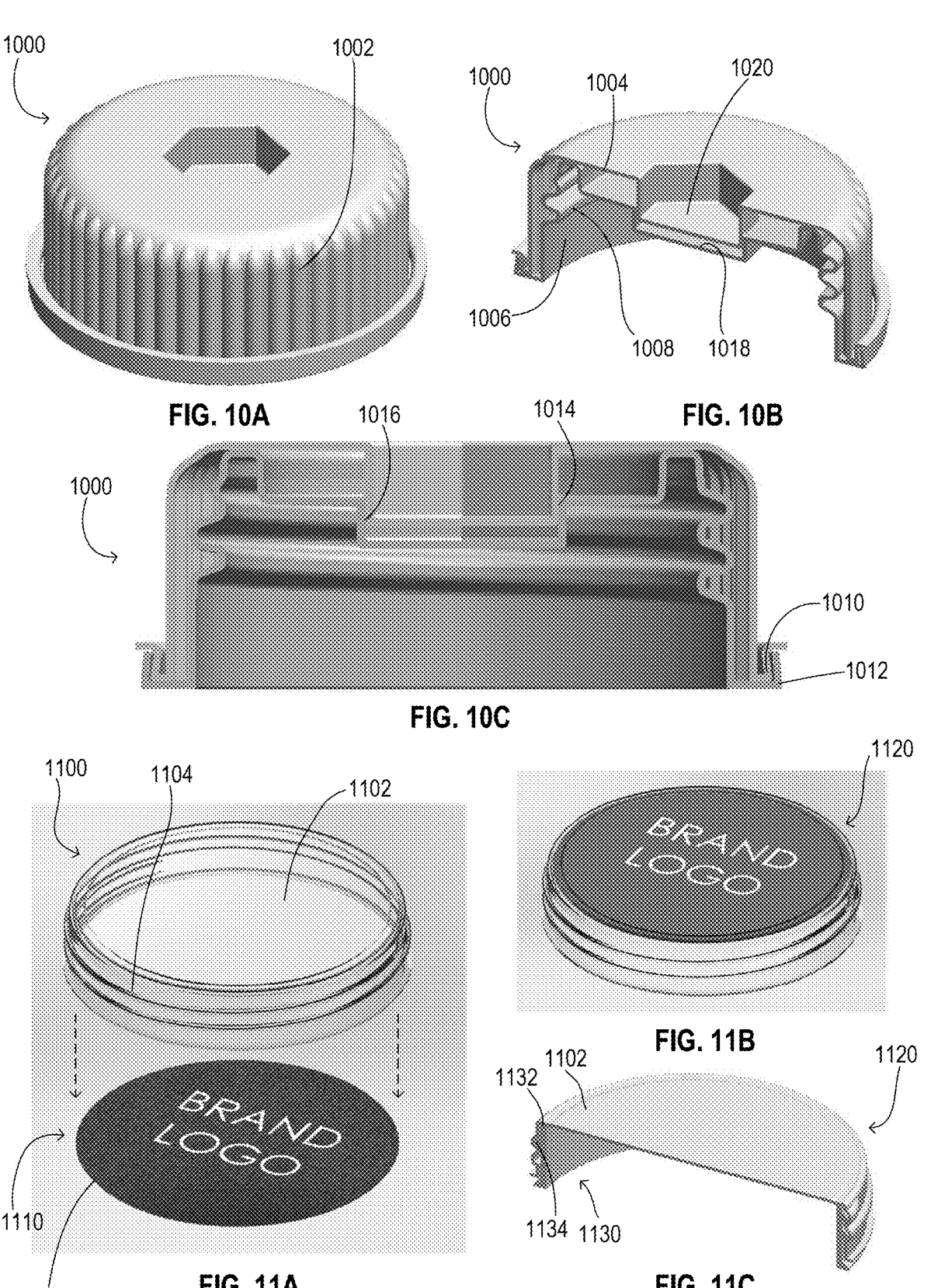
FIG. 10A illustrates a perspective view of yet another example of a closure including two separate thermoformed layers that are subsequently combined.
FIG. 10B illustrates a perspective diametrical cross-sectional view of the example of the closure illustrated in FIG. 10A.
FIG. 10C illustrates a diametrical cross-sectional view of the example of the closure of FIGS. 10A and 10B.
FIG. 11A illustrates a perspective view of yet another example of a closure and an example of a seal.
FIG. 11B illustrates a perspective view of a closure-seal combination of the example of the closure and the example of the seal illustrated in FIG. 11A.
FIG. 11C illustrates a perspective view of an example of a closure-seal combination on yet another example of a finish.

Referring to FIG. 10A, a perspective view of yet another example of a closure 1000 is illustrated. Closure 1000 includes two separate thermoformed layers that are subsequently combined: outer layer 1004, which includes a plurality of knurls 1002 evenly or unevenly distributed circumferentially about an outer surface of an outer layer outer cylindrical wall of outer layer 1004, and inner layer 1006, which includes thread 1008 on an inner surface of the inner layer outer cylindrical wall. Outer layer 1004 and inner layer 1006 may be joined together by a convenient mechanism, such as chemical, mechanical, or thermal bonding. As illustrated in FIG. 10A, outer layer 1004 includes first shaped downward depression 1020 in an outer layer lower wall, and inner layer 1006 includes a second shaped downward depression 1018 in an inner layer lower wall, as the perspective diametrical cross-sectional view of FIG. 10B illustrates. As illustrated in the diametrical cross-sectional view in FIG. 10C, a lower surface 1014 of first shaped downward depression 1020 may confront and lock axially against an upper surface 1016 of second shaped downward depression 1018. Outer layer 1004 includes outer layer folded band 1010 disposed radially outward along a bottom circumference of the outer layer outer cylindrical wall which may confront and lock within a groove of inner layer folded band 1012. Outer layer 1004 and inner layer 1006 may lock rotationally and axially when combined, but may be thermoformed separately so that plurality of knurls 1002 and inner thread 1008 may both be defined by direct contact with a surface of a mold.

Referring to FIG. 11A, a perspective view of yet another example of a closure 1100 is illustrated. Closure 1100 may be used with a finish of a container including a wide mouth. Closure 1100 includes thread 1104 and top wall 1102. Closure 1100 may be configured to close over a seal 1110. Seal 1110 may be attached to top surface 1132 of a finish 1130 of a container about circumference 1112 of seal 1110. Seal 1110 may be a foil seal or a foam seal. Seal 1110 may be configured as a tamper evidence feature that indicates whether a container has been opened by breaking contact between circumference 1112 and top surface 1132. Seal 1110 may include a brand logo on a face of seal 1110 facing top wall 1102 of closure 1100. Closure 1100 may be transparent such that a brand logo on a face of seal 1110 is visible through closure 1100, providing for marketing opportunities. FIG. 11B illustrates the closure-seal combination 1120 of closure 1100 with seal 1110 when seal 1110 is within closure 1100 and visible through top wall 1102. FIG. 11C illustrates a perspective view of closure-seal combination 1120 on finish 1130. Thread 1104 of closure contacts thread 1134 of finish 1130, such that closure 1100 covers seal 1110. Under closure 1100, circumference 1112 of seal 1110 is attached to top surface 1132.

Figure 12:
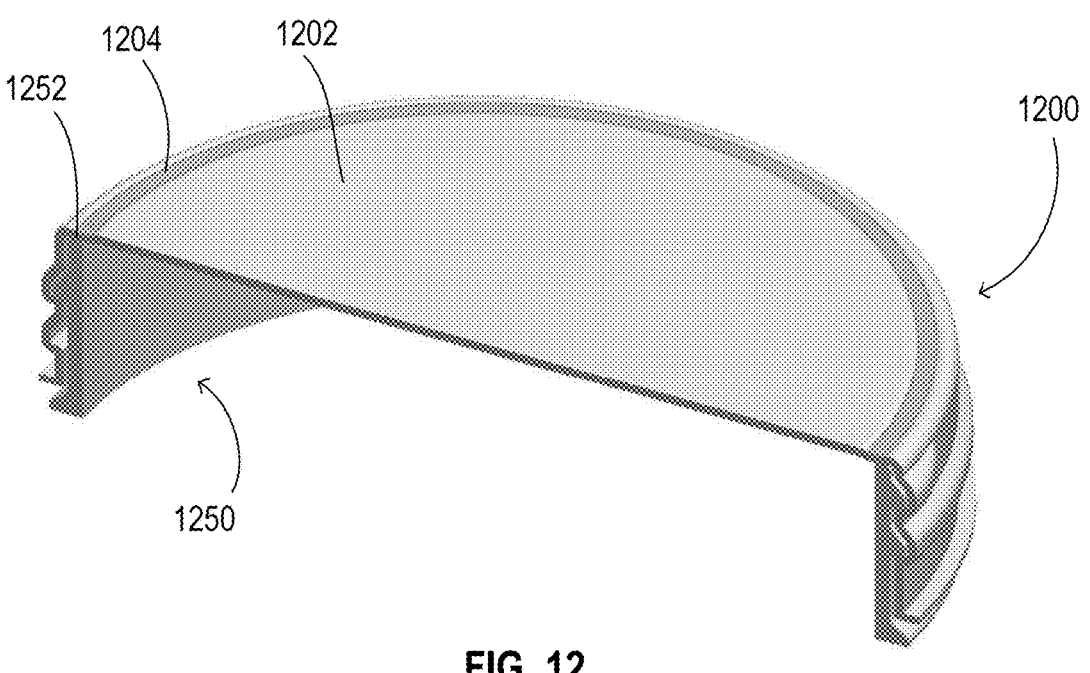
FIG. 12 illustrates a perspective diametrical cross-sectional view of yet another example of a closure on yet another example of a finish, a circumference of a top wall of the closure that is ultrasonically or thermally bonded to a top surface of the finish.

Referring to FIG. 12, a perspective diametrical cross-sectional view of yet another example of a closure 1200 on a finish 1250 of a container is illustrated. Finish 1250 may have a wide diameter, corresponding to a container with a wide mouth. Top wall 1202 of closure 1200 includes circumference 1204 that is ultrasonically or thermally bonded to top surface 1252 of finish 1250.

Figure 13:
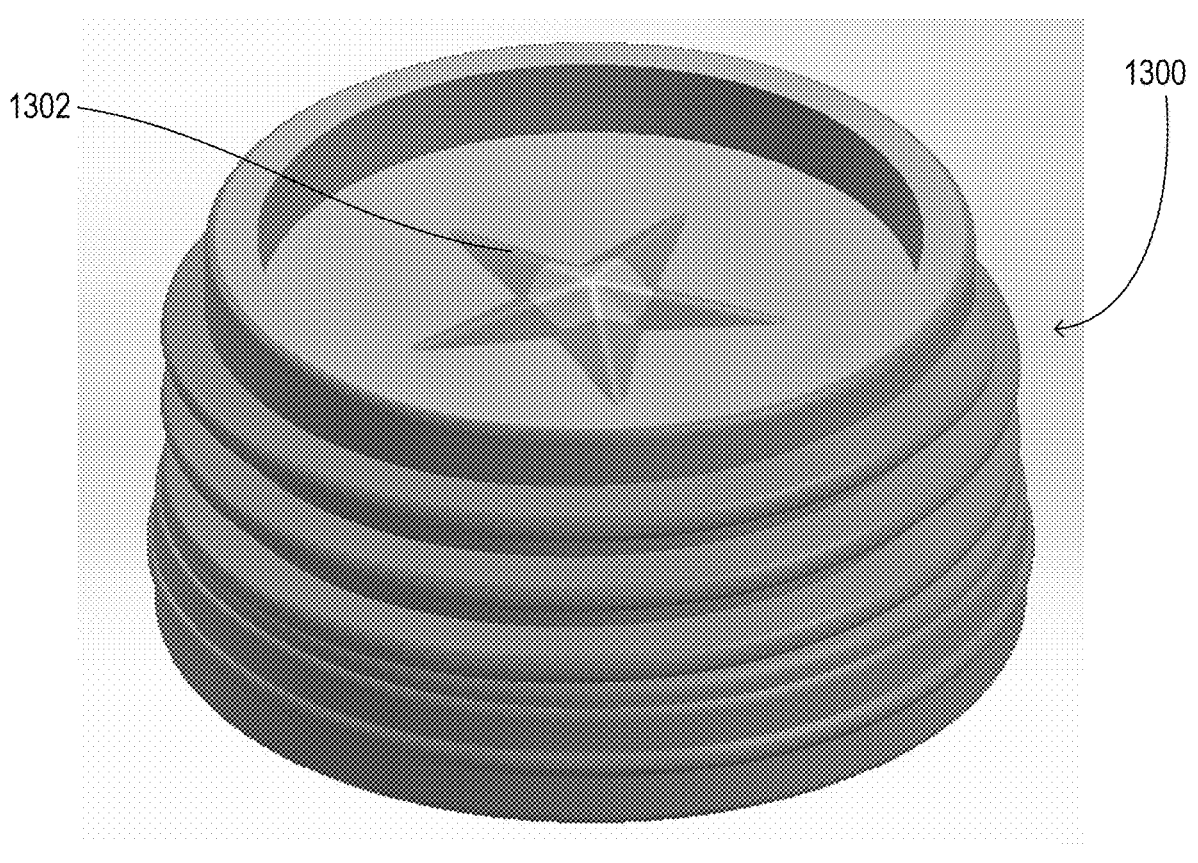
FIG. 13 illustrates a perspective of yet another example of a closure including a branding feature on a top wall.

Referring to FIG. 13, a perspective view of yet another example of a closure 1300 is illustrated. Closure 1300 includes branding feature 1302 in a top wall of closure 1300, which may be selectively colored. The geometry of closure 1300 may enhance the surface stiffness of closure 1300. As illustrated FIG. 13, the arms of the star branding feature 1302 may be formed as ribs or as stiffening elements to minimize deformation of closure 1300. A typical deformation may be doming or curvature caused by internal pressure from carbonation of a liquid within a container closed with closure 1300.

The present disclosure additionally provides methods of making closures described herein.

In an example, a method of making a closure described herein may include thermoforming a sheet of polyester resin into the closure. In certain examples, the thermoforming may include applying the sheet of polyester resin to a male mold.

In another example, a method of making a closure described herein may include injection molding or compression molding a polyester resin into the closure.

The present disclosure additionally provides methods of sterilizing closures and containers described herein.

In an example, a method of sterilizing a closure and a container described herein may include exposing the closure to a source of electromagnetic radiation capable of inactivating pathogens. Exposure of the closure to the source of electromagnetic radiation may be enhanced by the transparency of the closure. The closure may be exposed to the source of electromagnetic radiation before or after the closure is applied to the container. Electromagnetic radiation may be capable of inactivating pathogens. For example, electromagnetic radiation may be of a wavelength of from 200 to 300 nanometers. In certain examples, the exposing may be for a duration from 1 minute, or from 2 minutes, or from 5 minutes, or from 10 minutes, or from 15 minutes, or from 20 minutes, or from 25 minutes to 30 minutes or more; or from 2 minutes to 5 minutes, or to 10 minutes, or to 15 minutes, or to 20 minutes, or to 25 minutes, or to 30 minutes or more; or any range made from any two of the foregoing numbers, including any subranges therebetween. In other examples, the source of electromagnetic radiation may be of a wavelength of 253 nanometers to 254 nanometers. In still other examples, the source of electromagnetic radiation may be of a wavelength of from 255 nanometers to 280 nanometers. In still other examples, the source of electromagnetic radiation may be of a wavelength of about 230 nanometers. In still other examples, the source of electromagnetic radiation may be of a wavelength of less than $10^{-7}$ meters. In still other examples, the source of electromagnetic radiation may be of a wavelength of less than $10^{-11}$ meters. In still other examples, the source of electromagnetic radiation may be of a wavelength of up to $10^{-6}$ m. The source of electromagnetic radiation may also be of a wavelength within a range formed by any two foregoing wavelengths, including any subranges therebetween. In still other examples, the exposure may be to bursts of electromagnetic radiation of the same or varying wavelengths in a series. Examples of sources of electromagnetic radiation may include a low-pressure mercury lamp, ultraviolet light-emitting diodes, and a pulsed-xenon lamp. In still other examples, the closure may include an antimicrobial coating on an outer surface or on an inner surface.

In an example, the present disclosure provides a thermoformed polyester resin closure for closing a container, the closure including: an annular wall that seats up against atop surface of a rim of a finish of the container; an outer cylindrical wall that extends downwardly from the annular wall, the outer cylindrical wall including an outer skirt configured to be spaced outwardly from an outer surface of the rim of the finish to provide a clearance between the closure and the outer surface of the rim of the finish; an inner cylindrical wall that extends downwardly from the annular wall, the inner cylindrical wall configured such that an outwardly facing surface of the inner cylindrical wall has an interference fit with an inwardly facing surface of the finish of the container for sealing against the inwardly facing surface of the finish; and a lower wall that extends across a bottom of the inner cylindrical wall.

In certain examples, the polyester resin may include polyethylene terephthalate (PET).

In other examples, the polyester resin may include polyethylene furandicarboxylate (PEF).

In still other examples, the polyester resin may be a copolymer including PET and PEF.

In still other examples, the lower wall may include a ramped portion for centering the inner cylindrical wall during engagement of the closure with the finish.

In still other examples, the lower wall has a concave upward shape when in an unpressurized state and a concave downward shape when the closure closes a pressurized container, such that a pressure acts to increase a sealing force of the inner cylindrical wall against the finish.

In still other examples, the closure may be colored by a removable dye and/or an ink.

In still other examples, a nanocoating may be deposited on a surface of the closure.

In still other examples, the closure may include a tamper evidence band about a bottom circumferential surface of the outer cylindrical wall.

In still other examples, the tamper evidence band may include a plurality of knurls distributed about an outer surface or an inner surface of the tamper evidence band.

In still other examples, the tamper evidence band may be configured to form a tether for attaching the closure to the container when the closure is removed from the finish.

In still other examples, the outwardly facing surface of the inner cylindrical wall may be smooth.

In still other examples, the outwardly facing surface of the inner cylindrical wall may include a roughness of 0.2 microns.

In still other examples, the closure may further include a thread in the outer cylindrical wall for engaging a thread of the finish.

In still other examples, the closure may include a plurality of threads in the outer cylindrical wall, each of the plurality of threads beginning at a corresponding thread start.

In still other examples, the outer cylindrical wall may include a plurality of knurls or a plurality of knurled portions distributed about at least a portion of an outer surface or an inner surface of the outer cylindrical wall.

In still other examples, the closure may further include a seal attached to the rim of the finish to close the finish of the container, the seal in contact with the lower wall of the closure when the closure is applied to the finish of the container.

In still other examples, the container may include PET.

In still other examples, the container may include PET.

In still other examples, the container may include a copolymer including PET and PEF.

In still other examples, a method of sterilizing the closure may include: exposing the closure to a source of electromagnetic radiation capable of inactivating pathogens.

In still other examples, the method may further include applying the closure to the container before the exposing.

In still other examples, the method may further include applying the closure to the container after the exposing.

In still other examples, wherein the source of electromagnetic radiation may be of a wavelength of from 200 to 300 nanometers.

In still other examples, wherein the closure may include an antimicrobial coating on an outer surface and/or an inner surface.

In still other examples, a method of making the closure may include thermoforming a sheet of polyester resin into the closure.

In still other examples, the thermoforming may include applying the sheet of polyester resin to a male mold.

In another example, the present disclosure provides a thermoformed polyester resin closure for closing a container including a polyester, the closure including: a top wall that seats against a top surface of a rim of a finish of the container; and a cylindrical wall extending downwardly from the top wall and configured such that an inwardly facing surface of the cylindrical wall has an interference fit with an outwardly facing surface of the rim for sealing against the outwardly facing surface of the rim.

In certain examples, the polyester resin may include polyethylene terephthalate (PET).

In other examples, the polyester resin may include polyethylene furandicarboxylate (PEF).

In still other examples, the polyester resin may be a copolymer including PET and PEF.

In still other examples, the closure may be colored by a removable dye and/or an ink.

In still other examples, a nanocoating may be deposited on a surface of the closure.

In still other examples, the closure may include a tamper evidence band about a bottom circumferential surface of the cylindrical wall.

In still other examples, the tamper evidence band may include a plurality of knurls distributed about an outer surface or an inner surface of the tamper evidence band.

In still other examples, the tamper evidence band may be configured to form a tether for attaching the closure to the container when the closure is removed from the finish.

In still other examples, the closure may further include a thread in the cylindrical wall for engaging a thread of the finish.

In still other examples, the closure may include a plurality of threads in the cylindrical wall, each of the plurality of threads beginning at a corresponding thread start.

In still other examples, the cylindrical wall may include a plurality of knurls or a plurality of knurled portions distributed about at least a portion of an outer surface of the cylindrical wall or the inwardly facing surface.

In still other examples, the closure may include a seal attached to the rim of the finish to close the finish of the container, the seal in contact with a lower surface of the top wall of the closure when the closure is applied to the finish of the container.

In still other examples, the container may include PET.

In still other examples, the container may include PEF.

In still other examples, the container may include a copolymer including PET and PEF.

In still other examples, the closure may be shrunk onto the finish.

In still other examples, the closure may be heat shrunk onto the finish.

In still other examples, the closure may be bonded to the finish by thermal bonding or ultrasonic bonding.

In still other examples, the closure may be bonded to the top surface of the rim of the finish.

In still other examples, a bonding of the closure to the finish may be configured to provide tamper evidence.

In still other examples, a method of sterilizing the closure may include: exposing the closure to a source of electromagnetic radiation capable of inactivating pathogens.

In still other examples, the method may further include applying the closure to the container before the exposing.

In still other examples, the method may further include applying the closure to the container after the exposing.

In still other examples, wherein the source of electromagnetic radiation may be of a wavelength of from 200 to 300 nanometers.

In still other examples, wherein the closure may include an antimicrobial coating on an outer surface and/or an inner surface.

In still other examples, a method of making the closure may include thermoforming a sheet of polyester resin into the closure.

In still other examples, the thermoforming may include applying the sheet of polyester resin to a male mold.

In yet another example, the present disclosure provides an injection molded polyester resin closure for closing a container including a polyester, the polyester resin including polyethylene furandicarboxylate (PEF).

In certain examples, the polyester resin may include up to 90 mole percent of PEF and the PEF may be derived from a reaction of furandicarboxylic acid (FDCA) with polyethylene glycol (PEG) and/or diethylene glycol (DEG).

In other examples, a method of making the closure may include injection molding or compression molding the polyester resin into the closure.

In yet another example, the present disclosure provides a thermoformed polyester resin closure for closing a container including a polyester, the closure including: an outer layer including: an outer layer annular wall; an outer layer outer cylindrical wall that extends downwardly form the outer layer annular wall; an outer layer inner depression wall that extends downwardly form the outer layer annular wall; and an outer layer lower wall that extends across a bottom of the outer layer inner depression wall, the outer layer lower wall including a first shaped downward depression; and an inner layer including: an inner layer annular wall; an inner layer outer cylindrical wall that extends downwardly from the inner layer annular wall; an inner layer inner depression wall that extends downwardly from the inner layer annular wall, the inner layer inner depression wall configured such that an outwardly facing surface of the inner layer inner depression wall has an interference fit with an outwardly facing surface of the finish for sealing against the outwardly facing surface of the finish; and an inner layer lower wall that extends across a bottom of the inner layer inner depression wall, the inner layer lower wall including a second shaped downward depression that receives the first shaped downward depression; and wherein a lower surface of the first shaped downward depression is configured to confront and lock against an upper surface of the second shaped downward depression.

In certain examples, the outer layer outer cylindrical wall may include an outer layer folded band disposed radially outward along a bottom circumference of the outer layer outer cylindrical wall.

In other examples, the outer layer outer cylindrical wall may include a plurality of knurls distributed circumferentially about an outer surface of the outer layer outer cylindrical wall.

In still other examples, an inner surface of the inner layer outer cylindrical wall may include a thread for engaging a thread of a finish of the container.

In still other examples, the inner layer outer cylindrical wall may include an inner layer folded band disposed radially outward along a bottom circumference of the inner layer outer cylindrical wall.

In still other examples, the outer layer folded band may be configured to tightly fit within a groove between an outer surface of the inner layer outer cylindrical wall and the inner layer folded band.

In certain examples, the polyester resin may include polyethylene terephthalate (PET).

In other examples, the polyester resin may include polyethylene furandicarboxylate (PEF).

In still other examples, the polyester resin may be a copolymer including PET and PEF.

In still other examples, the inner layer lower wall may include a ramped portion for centering the inner layer inner cylindrical wall during engagement of the closure with the finish.

In still other examples, the inner layer lower wall may have a concave upward shape when in an unpressurized state and a concave downward shape when the closure closes a pressurized container, such that a pressure acts to increase a sealing force of the inner layer inner cylindrical wall against the finish.

In still other examples, the outer layer and/or the inner layer may be colored by a removable dye and/or an ink.

In still other examples, a nanocoating may be deposited on a surface of the outer layer and/or the inner layer.

In still other examples, the closure may include a tamper evidence band about a bottom circumferential surface of the inner layer.

In still other examples, the inner surface of the inner layer outer cylindrical wall may include a plurality of threads, each of the plurality of threads beginning at a corresponding thread start.

In still other examples, the container may include PET.

In still other examples, the container may include PEF.

In still other examples, the container may be a copolymer including PET and PEF.

In still other examples, a method of sterilizing the closure may include: exposing the closure to a source of electromagnetic radiation capable of inactivating pathogens.

In still other examples, the method may further include applying the closure to the container before the exposing.

In still other examples, the method may further include applying the closure to the container after the exposing.

In still other examples, wherein the source of electromagnetic radiation may be of a wavelength of from 200 to 300 nanometers.

In still other examples, wherein the closure may include an antimicrobial coating on an outer surface and/or an inner surface.

In still other examples, a method of making the closure may include: thermoforming a sheet of polyester resin into the outer layer; separately thermoforming a second sheet of polyester resin into the inner layer; and combining the outer layer and the inner layer.

In still other examples, the transforming may include applying the sheet of polyester resin to a male mold.

In still other examples, the separately transforming may include applying the second sheet of polyester resin to a second male mold.

EXAMPLES

The present disclosure may be better understood in connection with the following Examples. In addition, the non-limiting examples are an illustration. The person skilled in the art will appreciate that it may be necessary to vary the procedures for any given example of the present disclosure, e.g., vary the order or steps and/or the chemical reagents used.

Example 1

Thermoforming of PET Closures

Herein is described the development of a replacement of injection molded HDPE/PP-based PCO 1881 plastic bottle caps with a PET closure thermoformed from sheets of PET. Among the challenges during development were to develop a mold and a process to solve issues related to the plug seal, Tamper Evident ("TE") feature.

The use of a benchtop style JT-018 Dental Thermoformer ("JT-018") was explored. A primary objective was to create the geometry for and produce a prototype mold, for modeling PET closures. A goal was to create a thermoformed plug seal that met or exceeded industry standards for a closure, while also developing a TE band.

Use of the JT-018 allowed for the production of various iterations of a single closure that may be tested for functionality against industry standards for product seal, closure and opening torque, and tamper evident closures. Considerations in the production of the prototype also included mass production capabilities, and the closure process used by the bottling industries and equipment manufacturers.

Off-the-shelf equipment was modified to provide better process control. For example, controls were added to the heating element on the JT-018.

Specialized tools were developed for testing and process enhancement. For example, a pressure testing skid allowed for the pressure testing of finished molds. A cap punch allowed for the efficient cut of finished closures. A pressure bell allowed for increasing the external pressure on the thermoformer to gain higher detail.

A design for the mold for thermoforming the closure was developed in order to allow for demolding of dissimilar geometry without entrapment. A CAD program, Solid Works, was utilized to develop a mold that could be three-dimensionally printed and communicated to stakeholders. Three-dimensional printing of initial prototype molds allowed for the trial of several concepts, economically, with rapid turn-around of mold revisions. Rough surfaces that would translate to the finished thermoformed closure, and cause issues with seal integrity, were polished out using a multi-step polishing process starting at 800 Grit and ending at an 80,000 Grit jewelry polishing compound. The final thermoformed product was cut-out utilizing a cutting die and tested for performance against industry standards.

Engineering considerations included temperature control, an aluminum mold, an external pressure apparatus, and seal testing.

A. Temperature Control: PET is a crystalline plastic that has unique properties while being heated. PET enters its glass transition range, becoming malleable and clear, from 67-80° C. (153-76° F.). With time, PET crystallizes, becoming white in color and brittle, between 80-260° C. (176-500° F.). PET melts at 260° C. (500° F.). Thus, PET is versatile in usage but may have limitations. The molding machine has a maximum temperature of 457° C. (855° F.) and may heat the plastic too fast. Therefore, a variable resistor was inserted onto the molding machine to manage the temperature control to have more accurate temperatures and to be able to control molding of the PET easier.

B. Aluminum Mold: High Thermal Conductivity, or quick heat transfer, causes heat from PET during molding to be whisked away very quickly for fast cooling of the PET closure and fast cooling of the mold.

C. External Pressure Apparatus: Vacuum within the machine was needed to draw hot plastic into the crevices of the mold. Maximum vacuum that can be achieved is 1 bar (14 psi). Due to working in the glass range of the PET, more pressure was required to form sharp angles found on the mold. An external pressure apparatus may allow for a range of external pressures, wherein diminishing returns in the formation of the plastic around the mold were encountered after reaching 4.1 bar (60 psi). With the addition of the 4.1 bar (60 psi) external pressure along with the 1 bar (14 psi) internally, the plastic may form easily around the mold. Higher external pressures may further improve the definition of part features.

D. Testing for a Seal: Testing for a leak in the seal requires a way to generate pressure within the caps. A pressure testing apparatus was created to create the pressure on the cap and, then using water, look for air bubbles leaking from the caps.

The testing performed on the closures included torque testing, weights and measures (for example, based on thread depth, and cap weight), and seal testing. Testing was performed to determine the crystallization point of the material. Excess heat create a rapid crystallization transition phase that was difficult to control. A resistive control to the JT-018 was added to control the heat for repeated trials.

Table 1 provides crystallization data (Cycle Time for Forming PET Plastic). The temperature of the heater was at the heater's maximum temperature for all trials, which was approximately 468.3° C. (875° F.). The level from heater was mid-way between the mold and the heater.

TABLE 1

| Formation of Part | Time Under Heat | Vacuum Time While Forming | Crystallized |
|---|---|---|---|
| 10% | 24 sec | 3 sec | 100% |
| 15% | 22 sec | 3 sec | 100% |
| 20% | 21 sec | 5 sec | 85% |
| 90% | 18 sec | 5 sec | 0% |
| 50% | 12 sec | 5 sec | 0% |
| 30% | 18 sec | 18 sec | 0% |
| 70% | 19 sec | 19 sec | 0% |
| 90% | 19 sec | 1 sec | 10% |
| 90% | 16 sec | 1 sec | 0% |
| 90% | 20 sec | 1 sec | 5% |

Preliminary testing was performed on the finished mold, with marginal results. Limitations in the laboratory-scale vacuum-forming process failed to produce fully developed threads. As a result, torques in excess of 0.5 Nm were not achieved, and the cap failed to hold a measurable pressure. A device was added to induce exterior pressure and trials were repeated with improved control.

A device was constructed to allow for the application of external pressure during the forming process. Vacuum processing was limited to 1 atm (1.01 bar) of differential pressure under perfect seal conditions. The modified system allowed for the application of up to an additional 10 bar of differential pressure to force greater forming detail. Trials showed 4 bar to be sufficient. Table 2 summarizes the testing data.

TABLE 2

| Final Testing Torque and Seal Data (Heater at 288° C. for 21 sec) | | | | | |
|---|---|---|---|---|---|
| Seal Pressure Achieved (bar) | Closing Torque Achieved (Nm) | Depth of Thread Formation (mm) | Weight (g) | Thermo-forming Bell Pressure (bar) | Comments |
| 0.414 | 1.018 | 0.485 | 0.79 | 4.15 | |
| 1.241 | 1.356 | 0.6 | 0.82 | 4.15 | |
| 1.379 | 0.946 | 0.43 | 0.86 | 4.15 | |
| 2.413 | 2.599 | 0.69 | 0.8 | 4.15 | |
| 0.000 | 0.847 | 0.49 | 0.8 | 4.15 | |
| 0.138 | 0.508 | 0.375 | 0.81 | 4.15 | |
| 2.413 | 0.000 | 0.00 | 0.8 | 4.15 | Catastrophic Rupture |
| 0.517 | 0.226 | 0.44 | 0.83 | 4.15 | |
| 1.724 | 1.164 | 0.7 | 0.8 | 4.15 | |
| 1.793 | 1.977 | 0.415 | 0.8 | 4.15 | |
| 0.000 | 0.701 | 0.1 | 0.8 | 4.15 | Visual Malformation |
| 0.000 | 0.655 | 0.1 | 0.74 | 4.15 | Visual Malformation |
| 0.000 | 0.169 | 0.1 | 0.72 | 4.15 | Visual Malformation |
| 0.000 | 0.260 | 0.1 | 0.69 | 4.15 | Visual Malformations |

A correlation was observed between closing torque and seal pressures. As closing torque increases or decreases the ability to hold a seal has a proportional relationship.

Improvements to thread detail were realized in the seal when external pressure was applied during the thermoforming process. A correlation can be seen between increased seal pressure and produced thread torque.

Finished thermoformed caps were reviewed under a polarized film to reveal lines of stress and material deformation from the thermoforming process.

Other films were analyzed to validate the thermoforming process. These materials failed to develop a torque or ability to hold pressure, but the analysis showed nearly fully developed thread detail. Thus, modifications to increase pressure on thermoforming machine could lead to an increased performance with the thicker and stiffer PET material.

Example 2

Injection Molded PET Closure

Figures 16A, 16B:
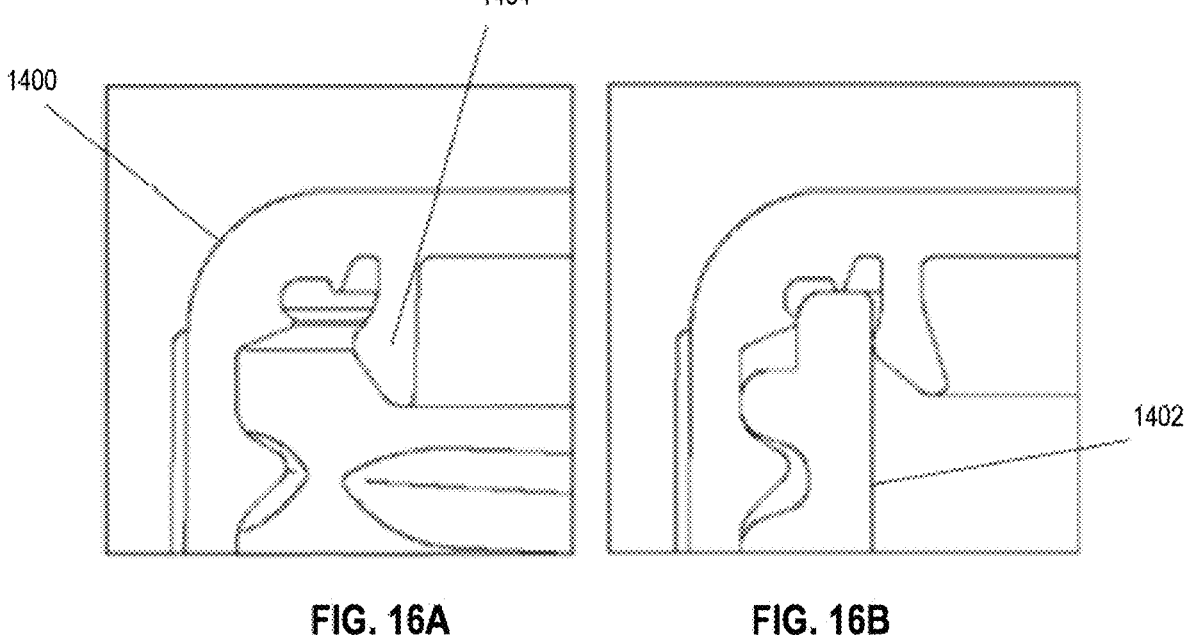
FIG. 16A illustrates a partial cross-sectional view of an upper portion of an example of an injection-molded closure.
FIG. 16B illustrates a partial cross-sectional view of the example of the closure illustrated in FIG. 16A mounted to yet another example of a finish.

In an example, closures may be injection-molded polyester resins, such as polyester resins having an FDCA and/or DEG content that sufficiently increases a compliance of the polyester resin material relative to PET to enable the material to be injection-molded. In certain examples, a closure is of a standard injection-molded configuration (in other words, a closure has a similar shape to injection-molded HDPE and PP closures), such as illustrated in FIGS. 16A and 16B. FIG. 16A illustrates a partial cross-sectional view of an upper portion of an injection-molded polyester resin closure 1400. FIG. 16B illustrates a partial cross-sectional view of closure 1400 mounted to finish 1402. Closure 1400 includes a conventional injection-molded plug seal 1404. The FDCA-and/or DEG-modified polyester resin may have sufficiently low modulus that plug seal 1404 may be able to achieve relatively high elastic deformation as is evident in comparing the deflection of plug seal 1404 in FIG. 16B relative to FIG. 16A.

In certain examples, an injection-molded closure is configured similarly to a standard injection-molded HDPE or PP closure but with lower wall thicknesses to reduce the relative stiffness of the closure. In addition to wall thickness, an interference fit may be reduced as discussed for the range used for thermoformed PET closures in order to accommodate the relatively higher stiffness of PET or co-monomer-modified polyester.

Example 3

Copolymer for Closures Produced Via Synthesis of 2% FDCA in PET

In an example, a copolymer suitable for closures was produced via polymerization of 2% FDCA in PET and SSP. The process of synthesizing the copolymer PET with 2% FDCA from PTA (or TPA) and EG was divided into two stages. The transesterification stage went on until the temperature of the top of the distillation was below 90° C., and the mixture was clear. Esterification was followed by polycondensation. During the course of synthesis, the reaction was monitored based on the amount of water produced and collected in a buffer tank. About 369 milliliters of water was recovered. The material was extracted from the reactor when the intrinsic viscosity reached approximately 0.55 dL/g based on torque calibration. The intrinsic viscosity may be increased using solid state polymerization, which further improves the performance of the prepared material for injection molding applications. Tables 3 and 4 below provide the reaction conditions in the esterification reactor and poly condensation reactor, respectively.

TABLE 3

| Esterification | |
| --- | --- |
| Materials | Amount |
| Esterification Reactor | |
| TPA | 1696 g |
| FDCA | 33 g |
| EG | 970 g |
| Triethylamine ("TEA") | 0.10 mL (50 ppm) |
| Final Properties | |
| Time | 5 h |
| Water collected | 369 mL |
| Temperature of the process | 260° C. |

TABLE 4

| Polycondensation | |
| --- | --- |
| Materials | Amount |
| Polycondensation Reactor | |
| Antimony dioxide | 0.84 g (350 ppm) |
| Phosphoric Acid | 0.16 mL (50 ppm) |
| Cobalt acetate tetrahydrate | 0.42 g (50 ppm) |
| Final Properties | |
| Time | 3 h |
| Temperature of the process | 280° C. |

Example 4

Impact of FDCA Fraction on Crystallization

An impact of the amount of FDCA present in a copolymer on crystallization in a polyester resin copolymer suitable for closures was demonstrated. Specifically, as the FDCA fraction was increased, the rate and degree of crystallization in PET was observed to decrease.

Table 5 provides DSC results that demonstrate (1) an increase in Tg with FDCA fraction, (2) an increase in Tm, and (3) a reduction in % crystallinity.

TABLE 5

| DSC Results | | | | |
| --- | --- | --- | --- | --- |
| FDCA (Weight %) | Tg (° C.) | Tc (° C.) | Tm (° C.) | % Crystallinity |
| 0 | 74.01 | 122.58 | 250.12 | 12 |
| 0.50 | 73.25 | 127.51 | 239.10 | 6 |
| 1.00 | 75.96 | 131.52 | 247.10 | 16 |
| 2.00 | 74.77 | 116.74 | 243.25 | 5.85 |
| 3.00 | 71.93 | 125.38 | 242.54 | 10 |
| 4.00 | 76.54 | 129.92 | 241.35 | 3 |

Varying the amount of FDCA also changed other physical and chemical properties of the resulting copolymer, including, for example, the modulus of elasticity, and gas diffusion (barrier) properties. Both % crystallinity of the copolymer and the mobility of the furan dicarboxylate component of the copolymer impact the modulus of elasticity and gas diffusion properties, such that the same % crystallinity in PET without FDCA had lower diffusion or mechanical properties than PET with FDCA.

Example 5

Thread Depth and Pressure Retention

Thread depth is both a function of the design of a mold and the forming process. With a given mold, thread depth may be adjusted through process control, which leads to a change in performance of the closure. When the threads are fully formed, the interaction between the finish and the closure is maximized for a certain mold design, so that the torque required to strip the closure by jumping the closure threads over the finish threads increases. The thread depth may also be a function of thickness and material stiffness, for example from increased crystallinity, so that multiple methods of increasing strip torque may be possible in one design. Once the fully formed thread performance is understood, it may be useful to perform a modification to the mold to deepen the possible thread formation limit. Another reason to adjust thread depth and contact surface may be to avoid increasing the application or removal torque beyond a limit that is comfortable for consumer use.

Using a standard laboratory-sized torque tester, a preform was placed in clamps and zeroed. Applying consistent torque in a clockwise manner, a closure was applied until snug, or until roughly 580 degrees. A positive value will be an Application Torque. Once a closure is applied, the closure was removed by applying force in a counterclockwise direction. A negative value will be a Removal Torque. Applying consistent torque in a clockwise manner, a closure was applied past snug or 580 degrees until failure. A positive value will be a Strip Torque. A closure will be deformed after a Strip Torque test. After several tests are performed a preform is exchanged with a new unused preform as a neck finish may be damaged after repeated tests, which may skew data. Torque may also be tested with a blown bottle filled with water.

A pressure retention test uses a standard battery bike/ball air pump to generate air pressure used to blow off a closure. The pump is connected to an additional pressure gauge to provide two readings on the pressure being applied. Pressurized air is routed into an 1881 neck. An 1881 closure was placed on a neck finish and secured with standard application procedures. The 1881 neck finish may be exchanged for other neck finishes and further 1881 necks. Air pressure rises until the 1881 closure reaches failure. Failure may be a slow leak with a steady decrease in air pressure inside a neck finish, or dramatic failure, which involves rapid loss of pressure.

TABLE 6

| Closure # | Thread Depth (mm) | | | | Pressure Retention (psi) | |
|---|---|---|---|---|---|---|
| | Test 1 | Test 2 | Test 3 | Average | Peak | Sustained |
| 1 | 0.83 | 0.92 | 0.9 | 0.88 | 27.5 | 22 |
| 2 | 0.95 | 1 | 0.98 | 0.98 | 23 | 15 |
| 3 | 0.87 | 1.06 | 0.83 | 0.92 | 22 | 14.5 |
| 4 | 0.87 | 0.89 | 1.08 | 0.95 | 20.5 | 17 |
| 5 | 0.75 | 0.94 | 0.78 | 0.82 | 25 | 18.5 |
| 6 | 0.75 | 0.78 | 0.72 | 0.75 | 22 | 12.5 |
| 7 | 0.84 | 0.91 | 0.82 | 0.86 | 24 | 19 |
| 8 | 1.01 | 0.97 | 1.03 | 1.00 | 23 | 20 |
| 9 | 0.95 | 1.08 | 1.05 | 1.03 | 23.5 | 15.5 |
| 10 | 1.04 | 1.07 | 0.9 | 1.00 | 21 | 15 |
| 11 | 0.82 | 0.86 | 0.78 | 0.82 | 20 | 15.5 |
| 12 | 0.8 | 0.99 | 0.9 | 0.90 | 22 | 15.5 |
| 13 | 0.89 | 0.95 | 0.94 | 0.93 | 20 | 15.5 |
| 14 | 0.93 | 0.85 | 1 | 0.93 | 17.5 | 14.5 |
| 15 | 0.89 | 0.78 | 0.9 | 0.86 | 22 | 13 |

TABLE 6-continued

| Closure # | Thread Depth (mm) | | | | Pressure Retention (psi) | |
|---|---|---|---|---|---|---|
| | Test 1 | Test 2 | Test 3 | Average | Peak | Sustained |
| 16 | 0.86 | 0.85 | 0.75 | 0.82 | 18.5 | 15.5 |
| 17 | 0.81 | 0.89 | 0.73 | 0.81 | 21 | 16 |
| 18 | 0.81 | 0.98 | 1.01 | 0.93 | 18 | 15.5 |
| 19 | 1.45 | 1.4 | 1.31 | 1.39 | 17 | 14 |
| 20 | 0.88 | 0.85 | 0.82 | 0.85 | 18 | 14.5 |
| 21 | 1.2 | 1.13 | 1.12 | 1.15 | 19.5 | 15 |
| 22 | 0.89 | 0.89 | 0.77 | 0.85 | 14 | 12.5 |
| 23 | 1.21 | 1.02 | 1.21 | 1.15 | 18 | 13.5 |
| 24 | 1.01 | 0.98 | 1.02 | 1.00 | 15 | 13.5 |
| 25 | 1.35 | 1.43 | 1.22 | 1.33 | 20.5 | 19 |

Figure 14:
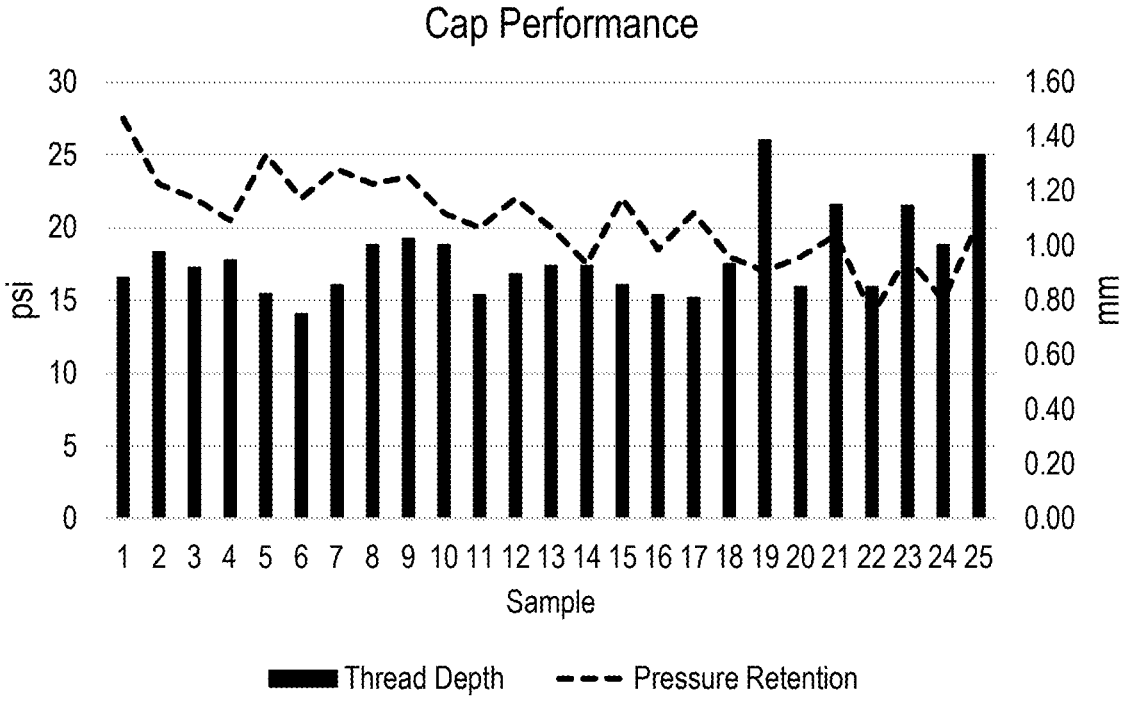
FIG. 14 illustrates a plot of average thread depth and pressure retention of twenty-five sample closures.
Figure 15:
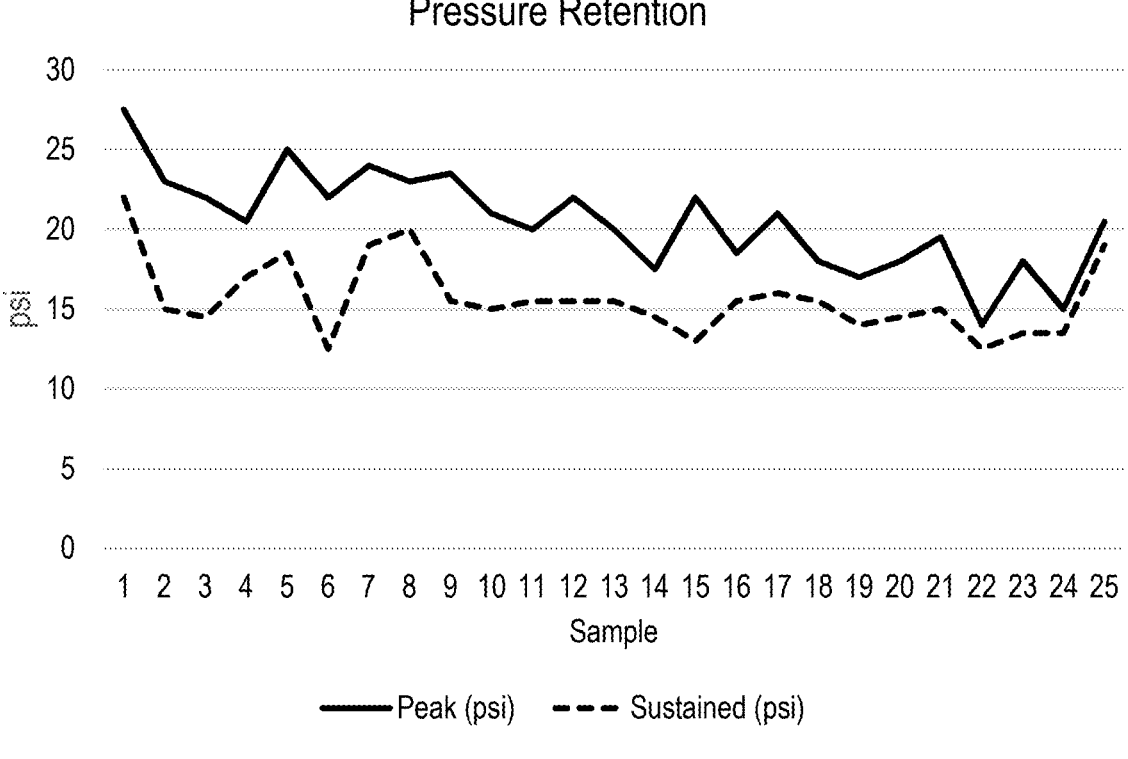
FIG. 15 illustrates a plot of the ability of twenty-five sample closures to retain pressure when applied to a finish of a container.

FIG. 14 illustrates a plot of average thread depth and pressure retention of twenty-five sample closures, and the relationship between average thread depth and pressure retention of the closures. FIG. 15 illustrates a plot of the ability of twenty-five sample closures to retain pressure when applied to a finish of a container. The higher performing examples of the twenty-five sample closures may be illustrative of a minimum performance as the manufacturing process is optimized.

The uses of the terms "a" and "an" and "the" and similar referents in the context of describing the present disclosure (especially in the context of the following claims) are to be construed to cover both the singular and the plural, unless otherwise indicated herein or clearly contradicted by context. The use of the term "plurality of" is defined by the Applicant in the broadest sense, superseding any other implied definitions or limitations hereinbefore or hereinafter unless expressly asserted by Applicant to the contrary, to mean a quantity of more than one. All methods described herein may be performed in any suitable order unless otherwise indicated herein by context.

As will be understood by one skilled in the art, for any and all purposes, all ranges recited herein also encompass any and all possible sub-ranges and combinations of sub-ranges thereof, as well as the individual values making up the range, particularly integer values. It is therefore understood that each unit between two particular units is also disclosed. For example, if "10 to 15" is disclosed, then 11, 12, 13, and 14 are also disclosed, individually, and as part of a range. A recited range (for example, weight percentages or carbon groups) includes each specific value, integer, decimal, or identity within the range. Any listed range may be easily recognized as sufficiently describing and enabling the same range being broken down into at least equal halves, thirds, quarters, fifths, or tenths. As will also be understood by one skilled in the art, all language such as "up to," "at least," "greater than," "less than," "more than," "or more," and the like, include the number recited and such terms refer to ranges that can be subsequently broken down into sub-ranges. In the same manner, all ratios recited herein also include all sub-ratios falling within the broader ratio. Accordingly, specific values recited for radicals, substituents, and ranges are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or examples whereby any one or more of the recited elements, species, or examples may be excluded from such categories or examples, for example, for use in an explicit negative limitation.

As used herein, the terms "comprise(s)," "include(s)," "having," "has," "can," "contain(s)," and variants thereof, are intended to be open-ended transitional phrases, terms, or words that do not preclude the possibility of additional acts or structures. The present description also contemplates other examples "comprising," "consisting of," and "consisting essentially of," the examples or elements presented herein, whether explicitly set forth or not.

In describing elements of the present disclosure, the terms "$1^{st}$," "$2^{nd}$," "first," "second," "A," "B," "(a)," "(b)," and the like may be used herein. These terms are only used to distinguish one element from another element, but do not limit the corresponding elements irrespective of the nature or order of the corresponding elements.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art.

As used herein, the term "about," when used in the context of a numerical value or range set forth means a variation of ±15%, ±14%, ±10%, or ±5%, among others, would satisfy the definition of "about," unless more narrowly defined in particular instances.

Although the present disclosure has been described with reference to examples and the accompanying drawings, the present disclosure is not limited thereto, but may be variously modified and altered by those skilled in the art to which the present disclosure pertains without departing from the spirit and scope of the present disclosure.

The subject-matter of the disclosure may also relate, among others, to the following aspects:

A first aspect relates to a thermoformed polyester resin closure for closing a container, the closure comprising: an annular wall that seats against a top surface of a rim of a finish of the container; an outer cylindrical wall that extends downwardly from the annular wall, the outer cylindrical wall comprising an outer skirt configured to be spaced outwardly from an outer surface of the rim of the finish to provide a clearance between the closure and the outer surface of the rim of the finish; an inner cylindrical wall that extends downwardly from the annular wall, the inner cylindrical wall configured such that an outwardly facing surface of the inner cylindrical wall has an interference fit with an inwardly facing surface of the finish of the container for sealing against the inwardly facing surface of the finish; and a lower wall that extends across a bottom of the inner cylindrical wall.

A second aspect relates to the closure of aspect 1, wherein the polyester resin comprises polyethylene terephthalate ("PET").

A third aspect relates to the closure of aspect 1, wherein the polyester resin comprises polyethylene furandicarboxylate ("PEF").

A fourth aspect relates to the closure of any preceding aspect, wherein the polyester resin is a copolymer comprising PET and PEF.

A fifth aspect relates to the closure of any preceding aspect, wherein the lower wall comprises a ramped portion for centering the inner cylindrical wall during engagement of the closure with the finish.

A sixth aspect relates to the closure of any one of aspects 1 to 4, wherein the lower wall has a concave upward shape when in an unpressurized state and a concave downward shape when the closure closes a pressurized container, such that a pressure acts to increase a sealing force of the inner cylindrical wall against the finish.

A seventh aspect relates to the closure of any preceding aspect, wherein the closure is colored by a removable dye and/or an ink.

An eighth aspect relates to the closure of any one of aspects 1 to 6, wherein a nanocoating is deposited on a surface of the closure.

A ninth aspect relates to the closure of any preceding aspect, wherein the closure comprises a tamper evidence band about a bottom circumferential surface of the outer cylindrical wall.

A tenth aspect relates to the closure of aspect 9, wherein the tamper evidence band comprises a plurality of knurls distributed about an outer surface or an inner surface of the tamper evidence band.

An eleventh aspect relates to the closure of aspect 9, wherein the tamper evidence band is configured to form a tether for attaching the closure to the container when the closure is removed from the finish.

A twelfth aspect relates to the closure of any preceding aspect, wherein the outwardly facing surface of the inner cylindrical wall is smooth.

A thirteenth aspect relates to the closure of any one of aspects 1 to 12, wherein the outwardly facing surface of the inner cylindrical wall comprises a roughness of 0.2 microns.

A fourteenth aspect relates to the closure of any preceding aspect, further comprising a thread in the outer cylindrical for engaging a thread of the finish.

A fifteenth aspect relates to the closure of aspect 14, comprising a plurality of threads in the outer cylindrical wall, each of the plurality of threads beginning at a corresponding thread start.

A sixteenth aspect relates to the closure of any preceding aspect, wherein the outer cylindrical wall comprises a plurality of knurls or a plurality of knurled portions distributed about at least a portion of an outer surface or an inner surface of the outer cylindrical wall.

A seventeenth aspect relates to the closure of any preceding aspect, further comprising a seal attached to the rim of the finish to close the finish of the container, the seal in contact with the lower wall of the closure when the closure is applied to the finish of the container.

An eighteenth aspect relates to the container of any preceding aspect, comprising PET.

A nineteenth aspect relates to the container of any one of aspects 1 to 17, comprising PEF.

A twentieth aspect relates to the container of any preceding aspect, comprising a copolymer comprising PET and PEF.

A twenty-first aspect relates to a method of sterilizing the closure of any one of aspects 1 to 17, comprising: exposing the closure and the container to a source of electromagnetic radiation capable of inactivating pathogens.

A twenty-second aspect relates to the method of aspect 21, further comprising applying the closure to the container before the exposing.

A twenty-third aspect relates to the method of aspect 21, further comprising applying the closure to the container after the exposing.

A twenty-fourth aspect relates to the method of any one of aspects 21 to 23, wherein the source of electromagnetic radiation is of a wavelength of from 200 to 300 nanometers.

A twenty-fifth aspect relates to the method of any one of aspects 21 to 24, wherein the closure comprises an antimicrobial coating on an outer surface and/or an inner surface.

A twenty-sixth aspect relates to a method of making the closure of any one of aspects 1 to 17, comprising thermoforming a sheet of polyester resin into the closure.

A twenty-seventh aspect relates to the method of aspect 26, wherein the thermoforming comprises applying the sheet of polyester resin to a male mold.

A twenty-eighth aspect relates to a thermoformed polyester resin closure for closing a container comprising a polyester, the closure comprising: a top wall that seats against a top surface of a rim of a finish of the container; and a cylindrical wall extending downwardly from the top wall and configured such that an inwardly facing surface of the cylindrical wall has an interference fit with an outwardly facing surface of the rim for sealing against the outwardly facing surface of the rim.

A twenty-ninth aspect relates to the closure of aspect 28, wherein the polyester resin comprises polyethylene terephthalate ("PET").

A thirtieth aspect relates to the closure of aspect 28, wherein the polyester resin comprises polyethylene furandicarboxylate ("PEF").

A thirty-first aspect relates to the closure of any one of aspects 28 to 30, wherein the polyester resin is a copolymer comprising PET and PEF.

A thirty-second aspect relates to the closure of any one of aspects 28 to 31, wherein the closure is colored by a removable dye and/or an ink.

A thirty-third aspect relates to the closure of any one of aspects 28 to 31, wherein a nanocoating is deposited on a surface of the closure.

A thirty-fourth aspect relates to the closure of any one of aspects 28 to 33, wherein the closure comprises a tamper evidence band about a bottom circumferential surface of the cylindrical wall.

A thirty-fifth aspect relates to the closure of aspect 34, wherein the tamper evidence band comprises a plurality of knurls distributed about an outer surface or an inner surface of the tamper evidence band.

A thirty-sixth aspect relates to the closure of aspect 34, wherein the tamper evidence band is configured to form a tether for attaching the closure to the container when the closure is removed from the finish.

A thirty-seventh aspect relates to the closure of any one of aspects 28 to 36, further comprising a thread in the cylindrical wall for engaging a thread of the finish.

A thirty-eighth aspect relates to the closure of aspect 37, comprising a plurality of threads in the cylindrical wall, each of the plurality of threads beginning at a corresponding thread start.

A thirty-ninth aspect relates to the closure of any one of aspects 28 to 38, wherein the cylindrical wall comprises a plurality of knurls or a plurality of knurled portions distributed about at least a portion of an outer surface of the cylindrical wall or the inwardly facing surface.

A fortieth aspect relates to the closure of any one of aspects 28 to 39, further comprising a seal attached to the rim of the finish to close the finish of the container, the seal in contact with a lower surface of the top wall of the closure when the closure is applied to the finish of the container.

A forty-first aspect relates to the container of any one of aspects 28 to 40, comprising PET.

A forty-second aspect relates to the container of any one of aspects 28 to 40, comprising PEF.

A forty-third aspect relates to the container of any one of aspects 28 to 42, comprising a copolymer comprising PET and PEF.

A forty-fourth aspect relates to the closure of any one of aspects 41 to 43, wherein the closure is shrunk onto the finish.

A forty-fifth aspect relates to the closure of aspect 44, wherein the closure is heat shrunk onto the finish.

A forty-sixth aspect relates to the closure of any one of aspects 41 to 43, wherein the closure is bonded to the finish by thermal bonding or ultrasonic bonding.

A forty-seventh aspect relates to the closure of aspect 46, wherein the closure is bonded to the top surface of the rim of the finish.

A forty-eighth aspect relates to the closure of aspect 46 or 47, wherein a bonding of the closure to the finish is configured to provide tamper evidence.

A forty-ninth aspect relates to a method of sterilizing the closure of any one of aspects 28 to 40, comprising: exposing the closure to a source of electromagnetic radiation capable of inactivating pathogens.

A fiftieth aspect relates to the method of aspect 49, further comprising applying the closure to the container before the exposing.

A fifty-first aspect relates to the method of aspect 49, further comprising applying the closure to the container after the exposing.

A fifty-second aspect relates to the method of any one of aspects 49 to 51, wherein the source of electromagnetic radiation is of a wavelength of from 200 to 300 nanometers.

A fifty-third aspect relates to the method of any one of aspects 49 to 52, wherein the closure comprises an antimicrobial coating on an outer surface and/or an inner surface.

A fifty-fourth aspect relates to a method of making the closure of any one of aspects 28 to 40, comprising thermoforming a sheet of polyester resin into the closure.

A fifty-fifth aspect relates to the method of aspect 54, wherein the thermoforming comprises applying the sheet of polyester resin to a male mold.

A fifty-sixth aspect relates to an injection molded polyester resin closure for closing a container comprising a polyester, wherein the polyester resin comprises polyethylene furandicarboxylate ("PEF").

A fifty-seventh aspect relates to the closure of aspect 56, wherein the polyester resin comprises up to 90 mole percent of PEF; and wherein the PEF is derived from a reaction of furandicarboxylic acid ("FDCA") with polyethylene glycol ("PEG") and/or diethylene glycol ("DEG").

A fifty-eighth aspect relates to a method of making the closure of aspect 56 or 57, comprising injection molding or compression molding a polyester resin into the closure.

A fifty-ninth aspect relates to a thermoformed polyester resin closure for closing a container comprising a polyester, the closure comprising: an outer layer comprising: an outer layer annular wall; an outer layer outer cylindrical wall that extends downwardly from the outer layer annular wall; an outer layer inner depression wall that extends downwardly from the outer layer annular wall; and an outer layer lower wall that extends across a bottom of the outer layer inner depression wall, the outer layer outer wall comprising a first shaped downward depression; and an inner layer comprising: an inner layer annular wall; an inner layer outer cylindrical wall that extends downwardly from the inner layer annular wall; an inner layer inner depression wall that extends downwardly from the inner layer annular wall, the inner layer inner depression wall configured such that an outwardly facing surface of the inner layer inner depression wall has an interference fit with an outwardly facing surface of the finish for sealing against the outwardly facing surface of the finish; and an inner layer lower wall that extends across a bottom of the inner layer inner depression wall, the inner layer lower wall comprising a second shaped downward depression that receives the first shaped downward depression; and wherein a lower surface of the first shaped downward depression is configured to confront and lock against an upper surface of the second shaped downward depression.

A sixtieth aspect relates to the closure of aspect 59, wherein the outer layer outer cylindrical wall comprises an outer layer folded band disposed radially outward along a bottom circumference of the outer layer outer cylindrical wall.

A sixty-first aspect relates to the closure of aspect 59 or 60, wherein the outer layer outer cylindrical wall comprises a plurality of knurls distributed circumferentially about an outer surface of the outer layer outer cylindrical wall.

A sixty-second aspect relates to the closure of any one of aspects 59 to 61, wherein an inner surface of the inner layer outer cylindrical wall comprises a thread for engaging a thread of a finish of the container.

A sixty-third aspect relates to the closure of any one of aspects 59 to 62, wherein the inner layer outer cylindrical wall comprises an inner layer folded band disposed radially outward along a bottom circumference of the inner layer outer cylindrical wall.

A sixty-fourth aspect relates to the closure of aspect 63, wherein the outer layer folded band is configured to tightly fit within a groove between an outer surface of the inner layer outer cylindrical wall and the inner layer folded band.

A sixty-fifty aspect relates to the closure of any one of aspects 59 to 64, wherein the polyester resin comprises polyethylene terephthalate ("PET").

A sixty-sixth aspect relates to the closure of any one of aspects 59 to 65, wherein the polyester resin comprises polyethylene furandicarboxylate ("PEF").

A sixty-seventh aspect relates to the closure of any one of aspects 59 to 66, wherein the polyester resin is a copolymer comprising PET and PEF.

A sixty-eighth aspect relates to the closure of any one of aspects 59 to 67, wherein the inner layer lower wall comprises a ramped portion for centering the inner layer cylindrical wall during engagement of the closure with the finish.

A sixty-ninth aspect relates to the closure of any one of aspects 59 to 68, wherein the inner layer lower wall has a concave upward shape when in an unpressurized state and a concave downward shape when the closure closes a pressurized container, such that a pressure acts to increase a sealing force of the inner layer inner cylindrical wall against the finish.

A seventieth aspect relates to the closure of any one of aspects 59 to 69, wherein the outer layer and/or the inner layer is colored by a removable dye and/or an ink.

A seventy-first aspect relates to the closure of any one of aspects 59 to 69, wherein a nanocoating is deposited on a surface of the outer layer and/or the inner layer.

A seventy-second aspect relates to the closure of any one of aspects 59 to 71, wherein the closure comprises a tamper evidence band about a bottom circumferential surface of the inner layer.

A seventy-third aspect relates to the closure of any one of aspects 59 to 72, wherein the inner surface of the inner layer outer cylindrical wall comprises a plurality of threads, each of the plurality of threads beginning at a corresponding thread start.

A seventy-fourth aspect relates to the container of any one of aspects 59 to 73, comprising PET.

A seventy-fifth aspect relates to the container of any one of aspects 59 to 73, comprising PEF.

A seventy-sixth aspect relates to the container of any one of aspects 59 to 75, comprising a copolymer comprising PET and PEF.

A seventy-seventh aspect relates to a method of sterilizing the closure of any one of aspects 59 to 73, comprising: exposing the closure to a source of electromagnetic capable of inactivating pathogens.

A seventy-eighth aspect relates to the method of aspect 77, further comprising applying the closure to the container before the exposing.

A seventy-ninth aspect relates to the method of aspect 78, further comprising applying the closure to the container after the exposing.

An eightieth aspect relates to the method of any one of aspects 77 to 79, wherein the source of electromagnetic radiation is of a wavelength of from 200 to 300 nanometers.

An eighty-first aspect relates to the method of any one of aspects 77 to 80, wherein the closure comprises an antimicrobial coating on an outer surface and/or an inner surface.

A eighty-second aspect relates to a method of making the closure of any one of aspects 59 to 73, comprising: thermoforming a sheet of polyester resin into the outer layer; separately thermoforming a second sheet of polyester resin into the inner layer; and combining the outer layer and the inner layer.

A eighty-third aspect relates to the method of aspect 82, wherein the transforming comprises applying the sheet of polyester resin to a male mold.

A eighty-fourth aspect relates to the method of aspect 82 or 83, wherein the separately transforming comprises applying the second sheet of polyester resin to a second male mold.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of making a polyester resin closure that mounts onto a finish of a container; the polyester resin closure comprising:

(a) at least one layer that comprises:

(i) an annular wall configured to seat against a top surface of a rim of the finish; and (ii) an outer cylindrical wall extending downward from the annular wall, wherein an outer layer outer cylindrical wall comprises a plurality of knurls;

(b) a tamper evidence feature configured to engage with a tamper evidence ledge of the finish;

the method comprising:

injection molding or compression molding the polyester resin into the polyester resin closure; and combining polyethylene terephthalate with an amount of furandicarboxylic acid (FDCA), diethylene glycol (DEG), or a combination thereof prior to the injection molding or the compression molding to reduce a modulus of the polyester resin and allow the polyester resin closure to be ejected from a cavity of a mold.

2. The method of claim 1, wherein the polyester resin comprises polyethylene terephthalate, polyethylene furandicarboxylate, or a copolymer thereof.

3. The method of claim 2, wherein the polyester resin is a polyethylene terephthalate copolymer.

4. The method of claim 3, further comprising incorporating a co-monomer into the polyethylene terephthalate copolymer to control crystallization and reduce melt processing temperatures.

5. The method of claim 3, wherein the polyethylene terephthalate copolymer is PETF.

6. The method of claim 1, wherein the modulus of the polyester resin is from 1 GPa to 3 GPa.

7. The method of claim 1, wherein the injection molding or the compression molding is performed with a movable core component.

8. The method of claim 1, wherein the outer cylindrical wall comprises internal threads configured to engage with the finish.

9. The method of claim 1, wherein the at least one layer of the polyester resin closure comprises:

a. an outer layer that comprises:

i. an outer layer annular wall; and ii. an outer layer outer cylindrical wall that extends downwardly from the outer layer annular wall; and b. an inner layer that comprises:

i. an inner layer annular wall; and ii. an inner layer outer cylindrical wall that extends downwardly from the inner layer annular wall.

10. The method of claim 9, wherein the outer layer outer cylindrical wall comprises a plurality of knurls.

11. The method of claim 9, wherein an inner surface of the inner layer outer cylindrical wall comprises internal threads configured to engage with the finish.

12. The method of claim 9, wherein the tamper evidence feature comprises a tamper evidence band.

13. The method of claim 9, wherein the outer layer comprises a different polyester resin than the inner layer.

14. The method of claim 1, wherein the polyester resin closure is transparent.

15. A method of making a polyester resin closure that mounts onto a finish of a container; the polyester resin closure comprising:

(a) at least one layer that comprises:

(i) an annular wall configured to seat against a top surface of a rim of the finish; and (ii) an outer cylindrical wall extending downward from the annular wall, wherein an outer layer outer cylindrical wall comprises a plurality of knurls;

(b) a tamper evidence feature configured to engage with a tamper evidence ledge of the finish;

the method comprising injection molding or compression molding polyester resin, which was synthesized while limiting a duration of solid-state polymerization, into the polyester resin closure, thereby resulting in the method being performed while limiting an intrinsic viscosity of the polyester resin.

16. The method of claim 15, wherein the limiting of the intrinsic viscosity comprises limiting the duration of solid-state polymerization of the polyester resin after the injection molding or the compression molding.

17. The method of claim 15, wherein the polyester resin comprises polyethylene terephthalate, polyethylene furandicarboxylate, or a copolymer thereof.

18. The method of claim 17, wherein the polyester resin is a polyethylene terephthalate copolymer.

19. The method of claim 18, further comprising incorporating a co-monomer into the polyethylene terephthalate copolymer to control crystallization and reduce melt processing temperatures.

20. The method of claim 18, wherein the polyethylene terephthalate copolymer is PETF.

21. The method of claim 15, wherein a modulus of the polyester resin is from 1 GPa to 3 GPa.

22. The method of claim 15, wherein the injection molding or the compression molding is performed with a movable core component.

23. The method of claim 15, wherein the outer cylindrical wall comprises internal threads configured to engage with the finish.

24. The method of claim 15, wherein the at least one layer of the polyester resin closure comprises:

a. an outer layer that comprises:

i. an outer layer annular wall; and ii. an outer layer outer cylindrical wall that extends downwardly from the outer layer annular wall; and b. an inner layer that comprises:

i. an inner layer annular wall; and ii. an inner layer outer cylindrical wall that extends downwardly from the inner layer annular wall.

25. The method of claim 24, wherein the outer layer outer cylindrical wall comprises a plurality of knurls.

26. The method of claim 24, wherein an inner surface of the inner layer outer cylindrical wall comprises internal threads configured to engage with the finish.

27. The method of claim 24, wherein the tamper evidence feature comprises a tamper evidence band.

28. The method of claim 24, wherein the outer layer comprises a different polyester resin than the inner layer.

29. The method of claim 15, wherein the polyester resin closure is transparent.

30. A method of making a polyester resin closure that mounts onto a finish of a container; the polyester resin closure comprising:

(c) at least one layer that comprises:

(i) an annular wall configured to seat against a top surface of a rim of the finish; and (ii) an outer cylindrical wall extending downward from the annular wall, wherein an outer layer outer cylindrical wall comprises a plurality of knurls;

(d) a tamper evidence feature configured to engage with a tamper evidence ledge of the finish;

the method comprising:

injection molding or compression molding the polyester resin into the polyester resin closure, wherein the method is performed while limiting an intrinsic viscosity of the polyester resin, and wherein the intrinsic viscosity of from 0.4 dE/g to 0.7 dL/g.

31. The method of claim 30, wherein the polyester resin comprises polyethylene terephthalate, polyethylene furandicarboxylate, or a copolymer thereof.

32. The method of claim 31, wherein the polyester resin is a polyethylene terephthalate copolymer.

33. The method of claim 32, further comprising incorporating a co-monomer into the polyethylene terephthalate copolymer to control crystallization and reduce melt processing temperatures.

34. The method of claim 32, wherein the polyethylene terephthalate copolymer is PETF.

35. The method of claim 30, wherein the modulus of the polyester resin is from 1 GPa to 3 GPa.

36. The method of claim 30, wherein the injection molding or the compression molding is performed with a movable core component.

37. The method of claim 30, wherein the outer cylindrical wall comprises internal threads configured to engage with the finish.

38. The method of claim 30, wherein the at least one layer of the polyester resin closure comprises:

a. an outer layer that comprises:
    i. an outer layer annular wall; and
    ii. an outer layer outer cylindrical wall that extends downwardly from the outer layer annular wall; and
b. an inner layer that comprises:
    i. an inner layer annular wall; and
    ii. an inner layer outer cylindrical wall that extends downwardly from the inner layer annular wall.

39. The method of claim 38, wherein the outer layer outer cylindrical wall comprises a plurality of knurls.

40. The method of claim 38, wherein an inner surface of the inner layer outer cylindrical wall comprises internal threads configured to engage with the finish.

41. The method of claim 38, wherein the tamper evidence feature comprises a tamper evidence band.

42. The method of claim 38, wherein the outer layer comprises a different polyester resin than the inner layer.

43. The method of claim 30, wherein the polyester resin closure is transparent.

\*   \*   \*   \*   \*